(12) United States Patent
Gopal

(10) Patent No.: US 10,437,739 B2
(45) Date of Patent: Oct. 8, 2019

(54) LOW-LATENCY ACCELERATOR

(71) Applicant: INTEL CORPORATION, Santa Clara, CA (US)

(72) Inventor: Vinodh Gopal, Westborough, MA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/715,594

(22) Filed: Sep. 26, 2017

(65) Prior Publication Data

US 2019/0095343 A1 Mar. 28, 2019

(51) Int. Cl.
*G06F 12/1036* (2016.01)

(52) U.S. Cl.
CPC ...... *G06F 12/1036* (2013.01); *G06F 2212/68* (2013.01)

(58) Field of Classification Search
CPC .................................................. G06F 12/1036
See application file for complete search history.

(56) References Cited

U.S. PATENT DOCUMENTS

| | | | | |
|---|---|---|---|---|
| 5,883,641 | A * | 3/1999 | Krech, Jr. ............. | G06F 9/3842 345/503 |
| 2010/0005272 | A1* | 1/2010 | Vuletic ................. | G06F 9/3877 711/213 |
| 2010/0153686 | A1* | 6/2010 | Frank ..................... | G06F 9/3851 712/34 |
| 2011/0161620 | A1* | 6/2011 | Kaminski ........... | G06F 12/1009 711/207 |
| 2011/0320523 | A1* | 12/2011 | Chan ...................... | G06F 17/301 709/203 |
| 2015/0378926 | A1* | 12/2015 | Busaba ................ | G06F 12/0891 711/141 |
| 2016/0179679 | A1* | 6/2016 | Morris ................ | G06F 12/0862 711/137 |
| 2016/0299858 | A1* | 10/2016 | Ching ...................... | G06F 13/24 |
| 2017/0017491 | A1* | 1/2017 | Ben-Kiki ............ | G06F 9/30145 |
| 2017/0371805 | A1* | 12/2017 | Jayasena ............. | G06F 12/1027 |
| 2018/0095750 | A1* | 4/2018 | Drysdale ............... | G06F 9/5044 |

* cited by examiner

*Primary Examiner* — Edward J Dudek, Jr.
(74) *Attorney, Agent, or Firm* — Law Office of R. Alan Burnett, P.S

(57) ABSTRACT

Methods, apparatus and associated techniques and mechanisms for reducing latency in accelerators. The techniques and mechanisms are implemented in platform architectures supporting shared virtual memory (SVM) and includes use of SVM-enabled accelerators, along with translation lookaside buffers (TLBs). A request descriptor defining a job to be performed by an accelerator and referencing virtual addresses (VAs) and sizes of one or more buffers is enqueued via execution of a thread on a processor core. Under one approach, the descriptor includes hints comprising physical addresses or virtual address to physical address (VA-PA) translations that are obtained from one or more TLBs associated with the core using the buffer VAs. Under another approach employing TLB snooping, the buffer VAs are used as lookups and matching TLB entries ((VA-PA) translations) are used as hints. The hints are used to speculatively pre-fetch buffer data and speculatively start processing the pre-fetched buffer data on the accelerator.

25 Claims, 13 Drawing Sheets

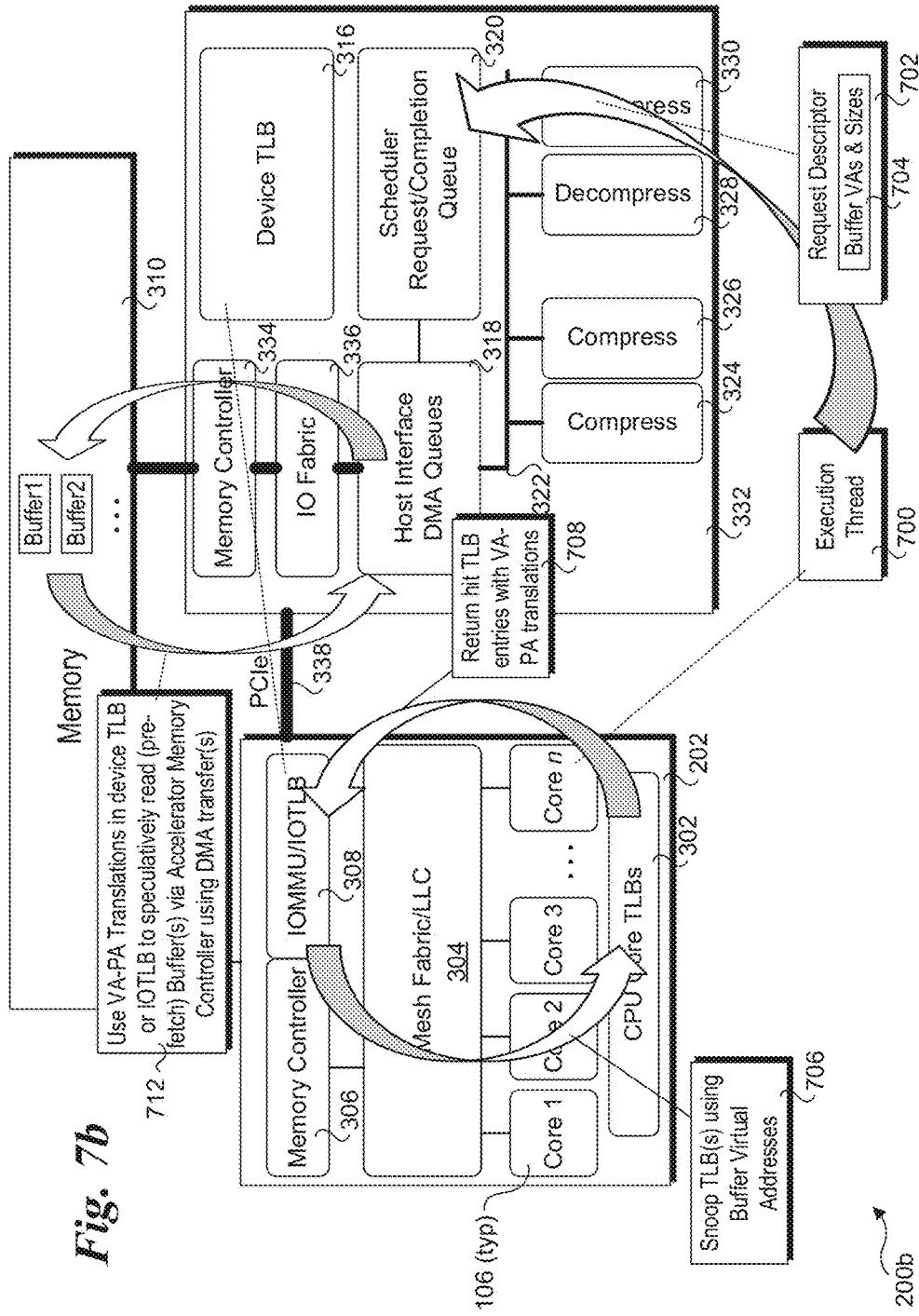

LOW-LATENCY ACCELERATOR

BACKGROUND

Data analytics and "Big Data" processing have become increasingly important in recent years. Data analytics and Big Data workloads require processing huge amounts of data. One approach for processing such huge amounts of data is to distribute the processing tasks across large numbers of servers and process the workload in parallel. For example, the Apache Hadoop software framework enables tasks to be distributed across large numbers of commodity servers and process workloads using MapReduce. While Hadoop and MapReduce provide excellent scalability, they require a tremendous amount of inter-server communication (when implemented at large scale), and do not efficiently use processor and memory resources.

Some compute and memory-bandwidth intensive workloads such as used for data analytics and "Big Data" are hard to get the required level of performance with processor cores. To address this, so-called "accelerators" have been developed. Accelerators were initially implemented as components that were coupled to CPUs (central processing units) and managed as an IO (input-output) device with its own address space, which requires significant levels of IO communication to transfer data between the accelerator address space and applications running in system memory address space. Recently, CPUs employing System on a Chip (SoC) architectures with embedded accelerators have been introduced.

Accelerators have steadily improved in capability with one of the most significant recent trends being "shared virtual memory" (SVM) capable accelerators. The traditional accelerator needed to be managed as an input-output (TO) device in its own personal address space; this was accomplished with expensive kernel-mode drivers (KMD) that needed applications to cross back and forth between user and kernel-space, pinning pages in memory or copying user buffers to/from special buffers managed by the OS/Kernel-mode-driver. With SVM, the accelerator or IO device can directly work on the address space of any user application thread, as it shares the same virtual→physical address translation capabilities as the CPU thread. This is a key improvement in accelerator efficiency (from the point of view of data movement), enables user-mode submissions directly to the accelerators (via a "user-mode-driver" or UMD) and results in easier programming models and adoption.

However, for applications that need low-latency processing (especially for small buffer processing), SVM also poses an interesting challenge. When an accelerator is provided a job to work on, the job descriptor identifies some input data buffers and output data buffers in virtual memory space the accelerator is to access. These buffers are allocated by the user application, and thus may generally comprise many different physical memory pages, depending on the sizes of the buffers. The accelerator needs to be able to translate the virtual addresses (VA) to physical addresses (PA) to work on the job. This address translation adds latency overhead to traditional accelerator designs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 6a is a combined schematic and dataflow diagram illustrating one embodiment of an implementation of the Enq_with_translations_v1 instruction using the platform architecture of FIG. 3a;

FIG. 7a is a combined schematic and dataflow diagram illustrating one embodiment of an TLB snooping mechanism using the platform architecture of FIG. 3a;

FIG. 7b is a combined schematic and dataflow diagram illustrating one embodiment of an TLB snooping mechanism using the platform architecture of FIG. 3b;

FIG. 10 is a schematic block diagram illustrating an example of an Arm-based microarchitecture suitable for implementing the Instruction Set Architecture (ISA) instructions disclosed herein.

DETAILED DESCRIPTION

Figure 1:
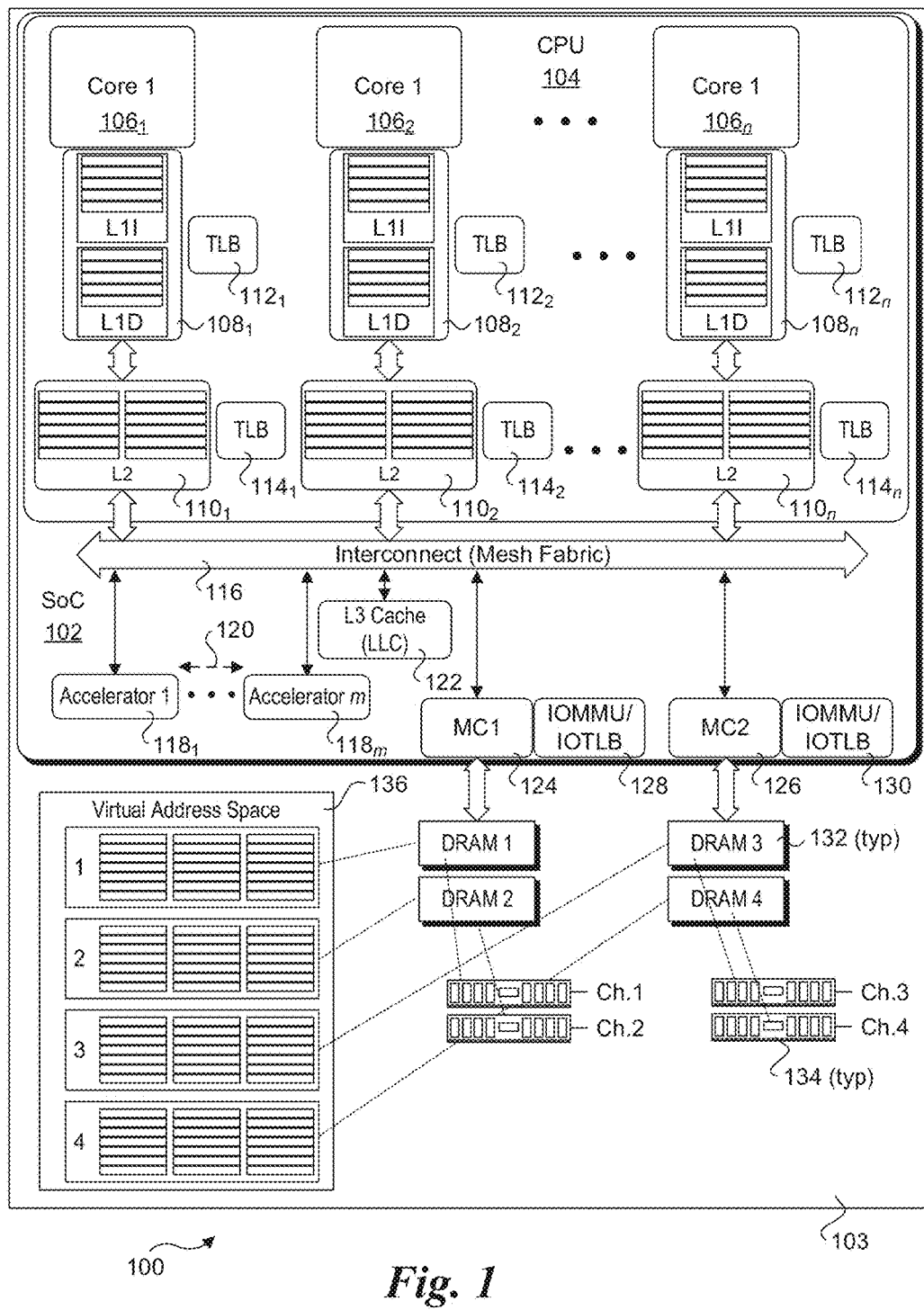
FIG. 1 is a schematic diagram of a first platform architecture including one or more on-chip accelerators.

Embodiments of methods and apparatus and associated techniques and mechanisms for reducing latency in accelerators are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

As discussed above, accelerators needs to be able to translate virtual addresses to physical addresses, which adds a large latency overhead to traditional accelerator designs. In accordance with aspects of the embodiments disclosed herein, techniques are provided for reducing the latencies associated with address translations used by SVM-capable accelerators. In one aspect, translation hints are provided from the CPU Cores/threads that submit the accelerator request to the accelerator so that the accelerator can start its computation as early as possible. This approach can be implemented using various mechanisms and schemes.

For example, in one embodiment an instruction is implemented that submits a descriptor to an accelerator with additional meta-data that contains valid VA-PA translations that have been read or copied from the CPU translation lookaside buffer(s) (TLB(s)) for the core executing an instruction thread including the instruction. Generally, such an instruction may be added to the processor's instruction set architecture (ISA) as a new ISA instruction, as described below in further detail.

Under another approach, an IO memory management unit (IOMMU) "snoops" the CPU core TLB and gets the translations that are cached there. These can be broadcast to all CPU cores, or done more efficiently in a point-to-point manner (which requires the information of which thread/core submitted the job). Note that for maximal efficiency, this process should be done as soon as the job descriptor arrives into the accelerator complex—if we wait until the descriptor eventually gets picked up for execution, the queue delay may have caused the core thread to have swapped out in the meantime.

When the accelerator works on the job, it uses these received VA-PA translations as hints and starts processing the job if it can. In parallel, in one embodiment the normal IOMMU process will be followed to obtain VA-PA translations for the requests, verifying them against the hints (if already used by the engine) or replacing the hints with the VA-PA translations from the IOMMU process (if the engine hasn't already used those pages).

While this works better for input data since that is being read into the accelerator complex, we need to be more careful for output data. This may be addressed in the following ways.

1. The above mechanisms (snooping or instruction-based) provide hints only for input/read data. The engines have to wait for the translations on the output buffers to come in from the IOMMU to write their data.

2. The mechanisms provide hints for all translations, but the engines have enough local memory to buffer up their output until the translations are verified by the IOMMU.

3. There is a special provision in some job submissions where the output data is part of a transaction. In such cases, the accelerator may be allowed to write data back to the output regions in memory based on the hints. However if the translations fail, the accelerator signals a "transaction abort".

Note that in cases where the input or output translations are wrong, the engine has to either redo from the start, or may have mechanisms to roll-back to check-pointed states.

Figure 2:
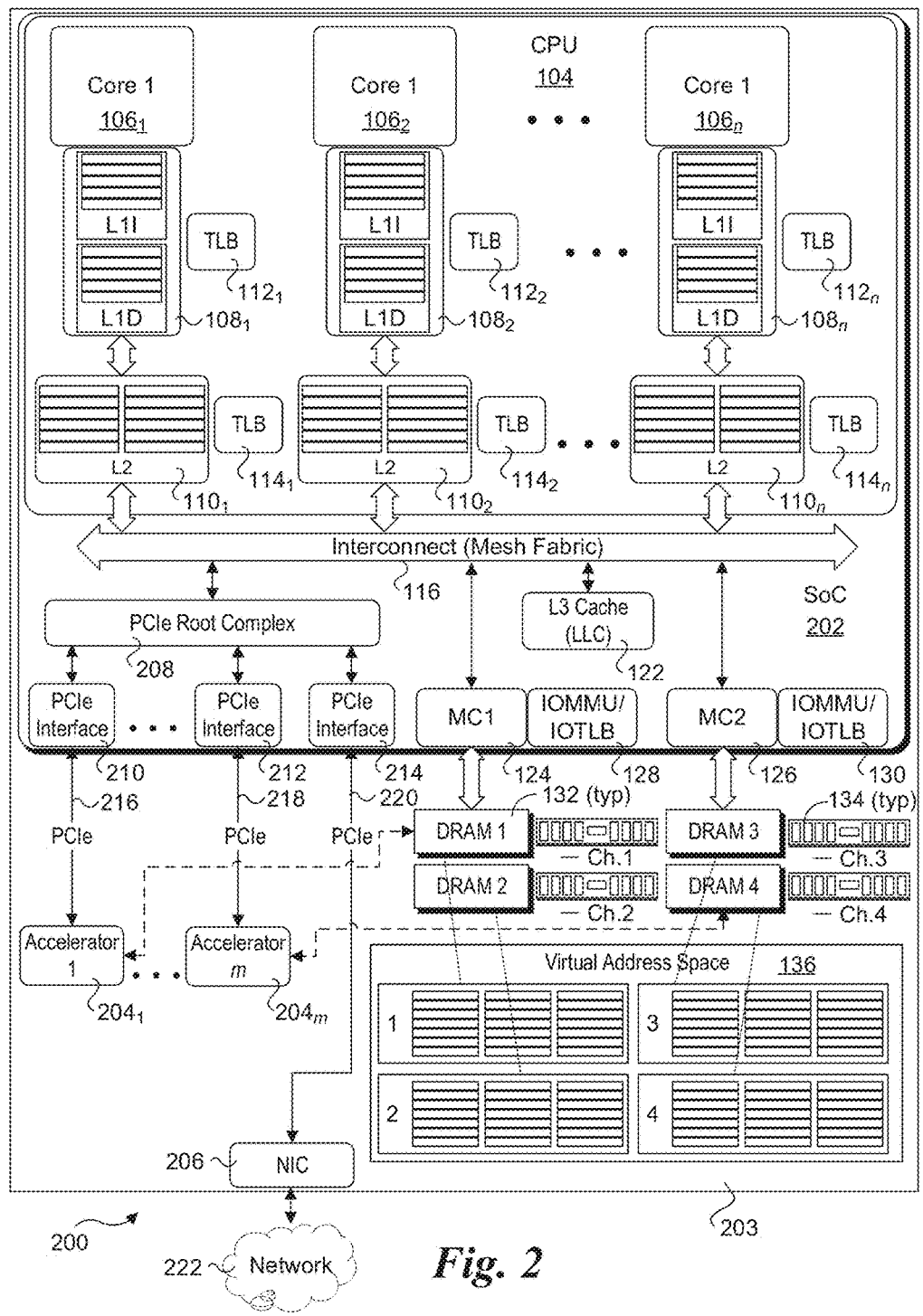
FIG. 2 is a schematic diagram of a second platform architecture including one or more off-chip accelerators.

FIGS. 1 and 2 show exemplary platform architectures 100 and 200 under which aspects of the embodiments described herein may be implemented. Platform architecture 100 includes a processor 102 having a System on a Chip (SoC) architecture mounted to a main board 103. Processor 102 includes a central processing unit (CPU) (also referred to as the core or core unit) including n processor cores $106_1$-$106_n$, wherein n is an integer. For example, n might be 2, 4, 6, 8, 10, 12, 16, or an even higher number. More generally, processor 102 is a multi-core processor, meaning it has at least two processor cores. Each of processor cores $106_1$-$106_n$ is coupled to first (L1) and second level (L2) caches, as depicted by L1 caches $108_1$-$108_n$ and L2 caches $110_1$-$110_n$. As further illustrated each L1 cache $108_1$-$108_n$ includes both an instruction cache (L1I) and a data cache (L1D).

Each of the L1 and L2 caches is associated with a respective translation lookaside buffer (TLB), as illustrated by TLBs $112_1$-$112_n$ for L1 caches $108_1$-$108_n$ and TLBS $114_1$-$114_n$ for L2 caches $110_1$-$110_n$. As further described and illustrated below, in some embodiments each of the L1 instruction and data caches L1I and L1D may have a respective TLB.

Processor 102 includes various interconnection circuitry that is used to interconnect various components on the processor. For simplicity, the interconnection circuitry is illustrated as an interconnect 116, which is also referred to as a mesh fabric. In practice, the mesh fabric may include one or more levels on interconnect infrastructure and an interconnection hierarchy, while each level may comprises a separate hierarchy unto itself (e.g., nested interconnected hierarchies). Generally, a given interconnect hierarchy may employ both structure and operations defined by standardized protocols or proprietary protocols. Moreover, there may be bridges between layers to enable interfacing between different types of protocols.

Various components on processor 102 are interconnected via interconnect 116, including L2 caches $110_1$-$110_n$, m (one or more) accelerators $118_1$-$118_m$, a third-level (L3) cache 122 (also referred to as a last-level cache or LLC), and a pair of memory controllers 124 and 126 (also labeled MC1 and MC2). It is further noted that each of the components illustrated for each processor core, including the core, the L1 cache and the TLBs is communicatively coupled to interconnect 116, via either direct or indirect connection.

Each of memory controllers 124 and 126 also has an associated IOMMU and IO TLB, collectively depicted as IOMMU/IOTLB block 128 and 130. In embodiments implementing multiple accelerators, the accelerators may be interconnect in a chain, as represented by dashed double-arrow 120. As further shown in FIG. 11, a processor will generally have additional components and interconnection circuitry that is not shown due to lack of space, including IO components and interfaces supporting communication with external IO components and expansion slots.

Each of memory controllers 124 and 126 includes one or more channels connected to one or more DRAM (Dynamic Random Access Memory) memory devices 132, such as Dual In-line Memory Modules (DIMMs) 134. In FIG. 1, these DRAM memory devices are depicted as DRAM 1-4. In the illustrated embodiment, a respective memory channel is connected to each DRAM memory device 132, as indicated by Ch. 1, Ch. 2, Ch. 3, etc., where "Ch." means channel. However, this is merely exemplary, as a memory controller may have more than one memory channel connected to the same memory device.

Each of DRAM memory devices 132 has a physical address space. Generally, the physical address space is partitioned into units of "pages," which are further partitioned into units of cachelines, although other addressing scheme may be used. The physical address spaces of the DRAM memory devices is mapped to a virtual address space, as shown by a virtual address space 136. The virtual address space is usually partitioned into a plurality of virtual memory "pages," and accessed at the page level, noting that individual cachelines may also be accessed with the pages. Mapping between the virtual and physical address spaces is generally handled by the memory controller and/or other platform components, including the IOMMU and the TLBs. The operating system may provide further aspects of this mapping, depending on the particular platform.

In one embodiment, processor 102 is operatively coupled to a printed circuit board comprising main board 103 via a "socket," or otherwise coupled to the main board via a direct coupling technique, such as flip-chip bonding. In either case, it is common practice in the art to refer to the processors themselves as sockets. Generally, main board 103 includes electrical wiring (e.g., traces and vias) to facilitate electrical connections corresponding to the physical structure of various interconnects depicted in FIG. 1.

Platform architecture 200 of FIG. 2 includes a processor 202, four DRAM memory devices 132, m accelerators 204$_1$-204$_m$, and a Network Interface Controller (NIC) 206 mounted our otherwise coupled to a main board 203. In addition to components with like reference numbers in FIGS. 1 and 2, processor 202 includes 10 components and interfaces comprising a PCIe (Peripheral Component Interconnect Express) Root Complex 208 coupled to multiple PCIe interfaces, depicted as PCIe interfaces 210, 212, and 214. PCIe interface 210 is coupled to accelerator 204$_1$ via a PCIe link 216, while PCIe interface 212 is coupled to accelerator 204$_m$ via a PCIe link 218 and PCIe interface 214 is coupled to NIC 206 via a PCIe link 220. PCIe supports various lane widths and speeds, including 1x, 2x, 4x, 8x, and 16x configurations, wherein 'x' represents the number of lanes. Both existing and future PCIe links and interfaces may be used for the PCIe links and interfaces shown FIG. 2 and discussed herein.

Generally, an off-chip accelerator may comprise a chip (e.g., a Field Programmable Gate Array (FPGA) or a chip with fixed, pre-programmed logic) that is mounted to the main board, or may reside on an accelerator board or card that is installed in a PCIe expansion slot. It is also possible to have multiple accelerator chips on the same board or card.

As discussed in further detail below, an off-chip accelerator, such as accelerators 204$_1$-204$_m$, may include a memory controller or other type of memory interface that enables the accelerator to access system memory devices over one or more memory channels. This is illustrated in FIG. 2, where accelerator 204$_1$ is connected to DRAM 1 via memory channel 1, while accelerator 204$_m$ is connected to DRAM 4 via memory channel 4, wherein the dashed line indicates the connections are optional.

Through the use of Direct Memory Access (DMA) support provided by PCIe and related components, NIC 206 is enabled to access system memory (e.g., DRAM memory devices 1-4) without requiring use of CPU 104. In addition, DMA operations may also be used to support data transfers between NIC 206 and one or more of accelerators 204$_1$-204$_m$, thus enabling packet processing operations for network traffic being received from and/or sent to a network 222 to be offloaded to one or more accelerators.

In addition to platform architecture using on-chip accelerators and off-chip accelerators, hybrid platform architecture that include both on-chip and off-chip accelerators are supported. The architectures generally combine applicable aspects of the on-chip and off-chip accelerators described herein.

Figure 3A:
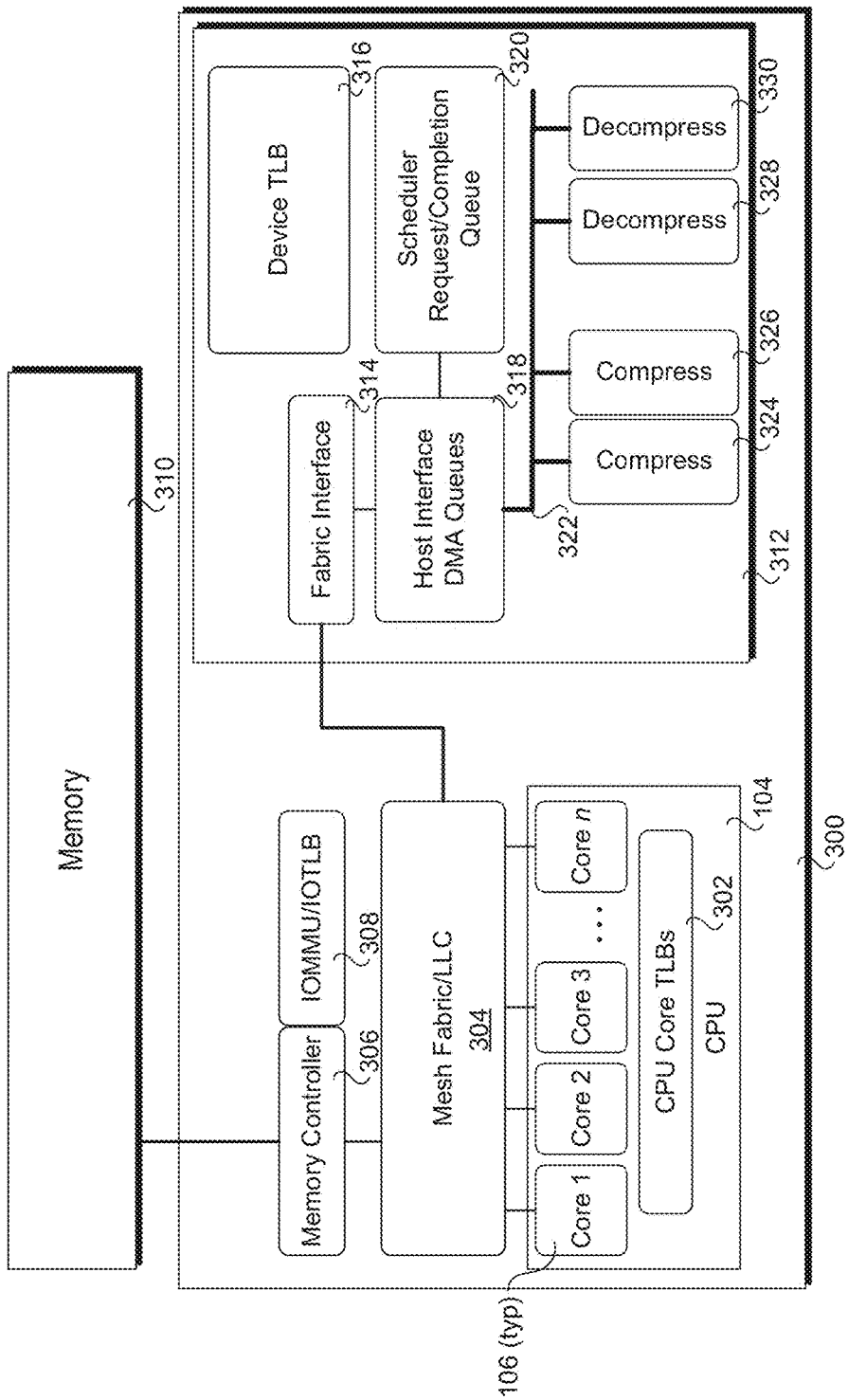
FIG. 3a is a schematic diagram illustrating further details of an on-chip accelerator, according to one embodiment.
Figure 3B:
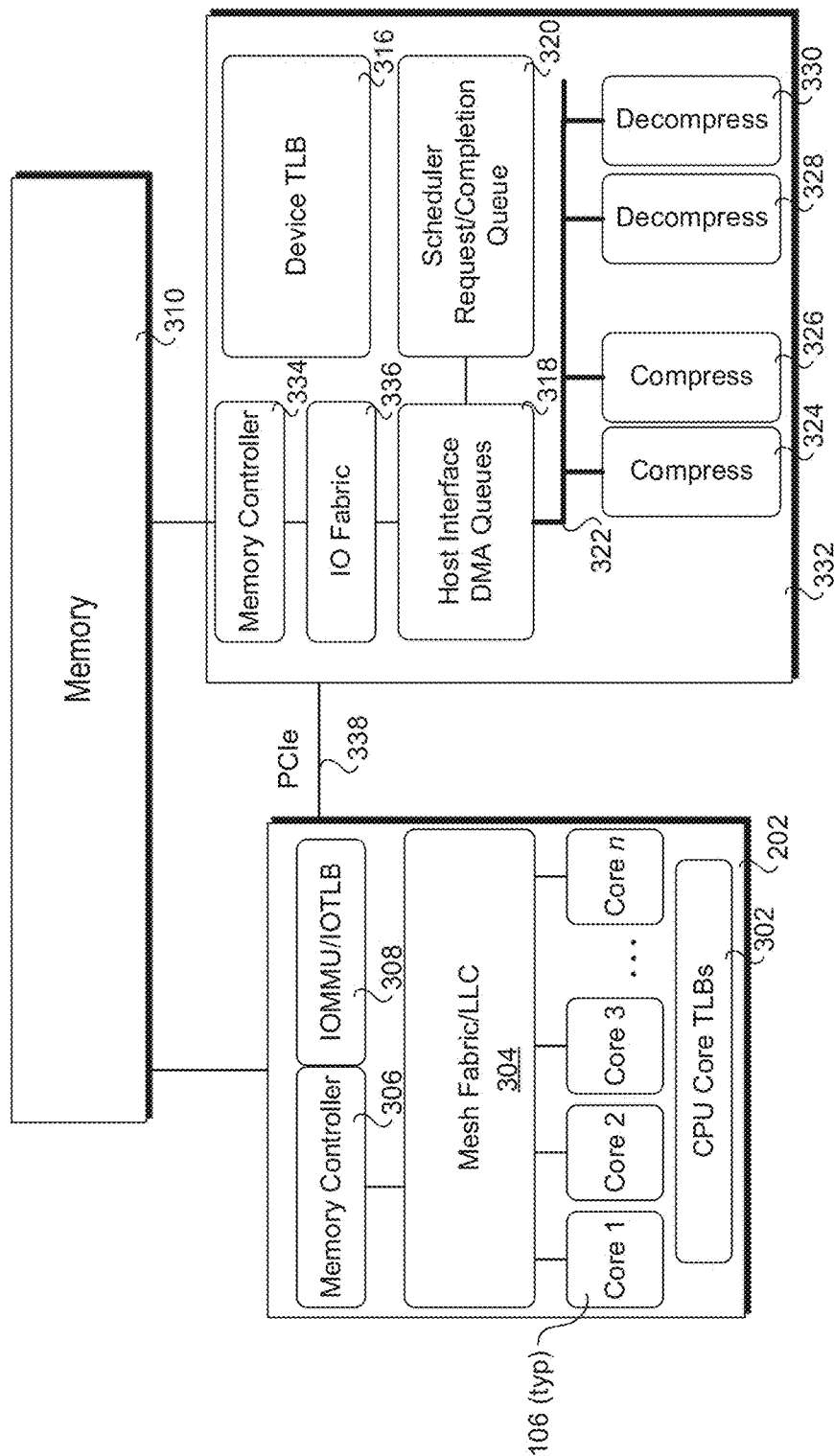
FIG. 3b is a schematic diagram illustrating further details of an off-chip accelerator, according to one embodiment.

FIGS. 3a and 3b show further details of the processors and accelerators shown in FIGS. 1 and 2. FIG. 3a shows a platform architecture 100a including a processor 300 having an on-chip accelerator 302 (also referred to as an accelerator complex when the accelerator supports multiple instances of accelerator functions). Processor 300 includes CPU 104 that comprises similar components shown for CPU 104 in FIGS. 1 and 2, collectively depicted as n cores 106 and CPU core TLBs 302; it will be recognized that CPU 104 would further include L1 and L2 caches, and the TLBs 302 are representative of TLBs 112$_1$-112$_n$ and TLBS 114$_1$-114$_n$ of FIGS. 1 and 2. Interconnect 116 and LLC 122 of processor 102 are collectively illustrated as a mesh fabric/LLC block 304, which is coupled to a memory controller 306 with an associated IOMMU/IOTLB 308. Memory controller 306 is coupled to memory 310, which is illustrative of one or more DRAM memory devices 132 of FIGS. 1 and 2. As before, memory controller 306 would be coupled to the DRAM memory devices with one or more memory channels per DRAM memory device (not shown).

FIG. 3a further shows an embodiment of an on-chip accelerator 312, which is representative of various types of accelerators. On-chip accelerator 312 includes a fabric interface 314, a device TLB 316, host interface DMA queues 318, a scheduler request/completion queue 320, and a bus 322 to which multiple compression and decompression blocks are coupled, as depicted by compress blocks 324 and 326, and decompress blocks 328 and 330. Fabric interface 314 is generally illustrative of various types of IO interfaces that can connect an on-chip accelerator to the interconnect infrastructure on the processor/SoC, as collectively illustrated and described herein as a mesh fabric. The particular interconnect structure and protocol may generally include both proprietary and standards-based interconnects.

For illustrative purposes, on-chip accelerator 312 shows functional units including two compression and decompression blocks. Accelerators are generally used to off-load CPU intensive tasks from a processor's cores, such as compression and decompression functions, which are math-intensive. Moreover, an accelerator may include embedded circuitry and logic that is tailored to efficient perform one or more specialized tasks, such as compression and decompression in the accelerators illustrated herein. The circuitry may be in the form of an ASIC (application-specific integrated circuit), or may include programmable circuitry/logic, such as provided via an FPGA. Such an FPGA may comprises one or more FPGA blocks, such as are available via license from various manufacturers. An FPGA block may also incorporate a custom design. Generally, the ASIC, FPGA block, or similar embedded circuitry and logic is referred to herein as a functional unit, which is designed to perform a corresponding function.

More generally, an accelerator may also be referred to as an "engine," wherein the engine may be programmed to perform one or more dedicated functions. In some embodiments, an engine may operate in a similar manner to an embedded processor, and be enabled to execute instructions (e.g., accelerator application/function instructions) for dedicated functions. An engine may also combine both execution of instructions in combination with embedded circuitry and logic.

Under the embodiment of FIG. 3b, a platform architecture 200a includes a processor 202 coupled to an off-chip accelerator 332. Processor 202 generally includes components similar to processor 202 of FIG. 2, as collectively illustrated in a manner similar to FIG. 3a, including n cores 106, CPU core TLBs 302, mesh fabric/LLC 304, memory controller 306, and IOMMU/IOTLB 308. Likewise, components and blocks of off-chip accelerator 332 and one-chip accelerator 312 with the same reference numbers operate in a similar manner to that described above with reference to FIG. 3a.

In addition to these components and blocks, of-chip accelerator 332 further includes a memory controller 334 and an IO fabric block 336. In the illustrated embodiment, memory controller 334 is coupled to memory 310, which, as discussed above, is representative of one or more DRAM memory devices. As such memory controller 334 may generally be connected to one or more DRAM memory devices via one or more memory channels.

In the illustrated embodiment of FIG. 3b, off-chip accelerator 332 is connected to processor 202 via a PCIe link 338. Accordingly, each of processor 202 and off-chip accelerator 338 would further include a PCIe interface at the opposing ends of PCIe link 338 (not shown for clarity). As discussed above, an off-chip accelerator may be included an accelerator board or card installed in a PCIe expansion slot or the like, as well as being mounted to a main board. In addition to PCIe, other means of communication may be employed for coupling an off-chip accelerator in communication with a processor.

Host Interface DMA queues 318 and scheduler request/completion queue 320 enable accelerators 312 and 332 to support DMA operations under which accesses to memory 310 and other platform components (e.g., NIC 206 of FIG. 2) are performed without requiring any CPU involvement. For example, under an accelerator configured to support compression and decompression, network traffic received at a receive port on a NIC may be decompressed by an accelerator prior to forwarding the traffic for further processing by a network stack implemented via execution of software instructions on a processor core. Similarly, for outbound traffic (i.e., data to be send onto a network via a NIC transmit port), the traffic may be compressed by an accelerator.

In accordance with aspects of various embodiments described and illustrated herein, including the embodiments of FIGS. 6a, 6b, 7a, and 7b, TLB entries comprising VA-PA translations are read or copied from TLBs and used (either the VA-PA translation or just the PA) as hints to facilitate speculative retrieval (i.e., pre-fetching) and processing of data using an accelerator. To better understand operations associated with reading/copying TLB entries and/or providing hints in accordance with embodiments described herein, a discussion of the operation of an exemplary 64-bit TLB architecture is now provided, with reference to FIGS. 4 and 5.

The 64-bit architecture employs a virtual addressing model, which is fundamentally a 64-bit flat linear address space. 64-bit registers are used as pointers into this address space. The architecture also supports 32-bit virtual linear addresses, which are zero extended into the 64-bit virtual address space.

The 64-bit virtual address space is divided into eight $2^{61}$ byte virtual regions. A region is selected by the upper 3-bits of the virtual address. Associated with each virtual region is a region register that specifies a 24-bit region identifier for the region. Eight out of the possible $2^{24}$ virtual address spaces are concurrently accessible via 8 region registers. If desired, regions can be coalesced by assigning sequential region identifiers, e.g., to produce 62-, 63-, or 64-bit spaces.

Figure 4:
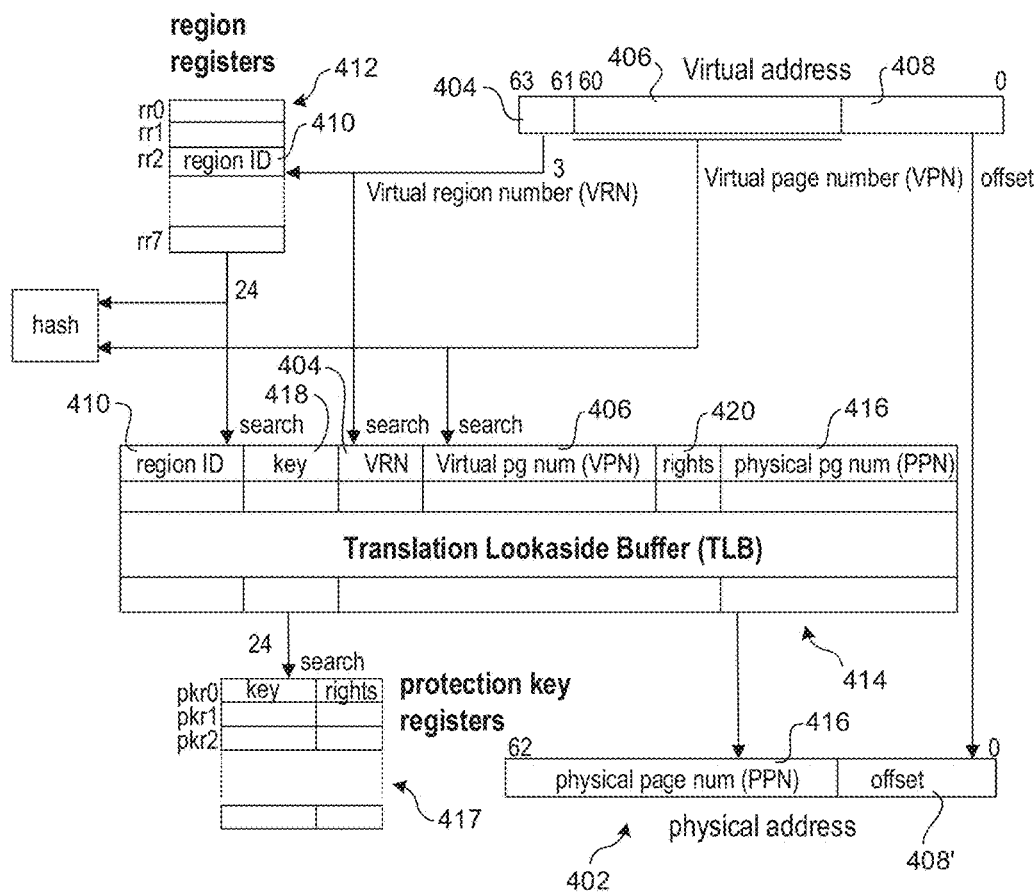
FIG. 4 is a schematic diagram of an address translation scheme including a translation lookaside buffer (TLB) employed by 64-bit processor architecture.

FIG. 4 shows the process of mapping (also referred to as "translating") a virtual address 400 into a physical address 402, resulting in a VA-PA translation. The bits of virtual address 400 are divided into three fields: 404, 406, and 408. Field 404 comprises the most-significant three bits 61-63, which are used to point to a virtual region number (VRN). Field 408, which comprise the least significant bits, form the page offset. The remaining bits, comprising field 406, are used to specify a virtual page number (VPN). The page-offset bits (field 408) are passed through the translation process unmodified, as shown by a physical address page offset 408'. Exact bit positions for the page offset and VPN bits (field 406) vary depending on the page size used in the virtual mapping. Allowable page sizes include 4K, 8K, 16K, 64K, 256K, 1M, 4M, 16M, 64M, 256M, and 4G.

On a memory reference (other than an insert or purge), the VRN bits of field 404 select a region identifier (RID) 410 from 1 of the 8 region registers 412. A TLB 214 is then searched for a translation entry with a matching VPN and RID value. If a matching translation entry is found, the entry's physical page number (PPN) 416 is concatenated with the page-offset bits (offset 208') to form the physical address 402. Matching translations are qualified by page-granular privilege level access right checks and optional protection domain checks by verifying the translation's key is contained within a set of protection key registers 417 and read, write, or execute permissions are granted. The key value is defined in the TLB's key field 418, while access rights are specified in a rights field 420.

If a translation is not resident in the TLB, the processor may optionally search a virtual hash page table (VHPT) structure in memory (not shown) for the required translation and install the entry into the TLB. If the required entry cannot be found in either the TLB or VHPT, the processor raises a TLB Miss fault to request that the operating system supply the translation. After the operating system installs the translation in the TLB and/or VHPT, the faulting instruction can be restarted and execution resumes.

Figure 5:
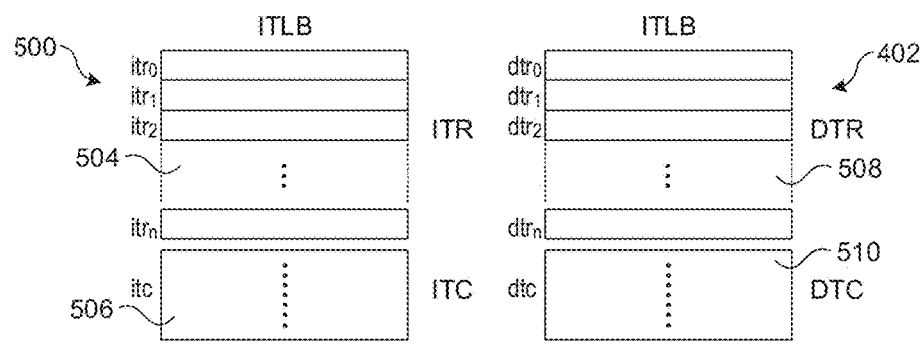
FIG. 5 is a schematic diagram illustrating further details of the TLB of FIG. 4, including translation registers.

In one embodiment, a 64-bit processor maintains two architectural TLBs, as shown in FIG. 5, including an instruction TLB (ITLB) 500 and a data TLB (DLTB) 502. Each TLB services translation requests for instruction and data memory references, respectively. The data TLB 502 also services translation request for references by the RSE and the VHPT walker. Each of instruction TLB 500 and the data TLB 502 are further divided into two sub-sections: Translation Registers (TR) (ITR 504 and DTR 506) and Translation Cache (TC) (ITC 508 and DTC 510).

The Translation Register section of the TLB is a fully-associative array defined to hold translations directly managed by software (e.g. an OS) and/or firmware. Software/firmware may explicitly insert a translation into a TR by specifying a register slot number. Translations are removed from the TRs by specifying a virtual address, page size and a region identifier. Translation registers allow the operating system to "pin" critical virtual memory translations in the TLB. Examples include I/O spaces, kernel memory areas, frame buffers, page tables, sensitive interruption code, etc.

Entries are placed into a specific TR slot with the Insert Translation Register (itr) instruction. Once a translation is inserted, the processor will not automatically replace the translation to make room for other translations. Local translations can only be removed by issuing the Purge Translation Register (ptr) instruction.

It will be appreciated by those having skill in the art that the foregoing description of a 64-bit TLB and associated architecture illustrated in FIGS. 4 and 5 are merely exemplary of one type of TLB and not limiting. Other types of TLB architecture may be implement in accordance with the principles and teachings of the embodiments herein using techniques that are well-known in the art.

IO devices that are SVM capable have to perform address translations before read/write transactions are submitted on the IO fabrics. One mechanism is to have a TLB in the device that caches some translations. If the translation cannot be serviced by the Device-TLB, the request is sent to the IOTLB in the IOMMU. The address translation is performed by the IOMMU by looking up the IOTLB and if there is no entry, initiating page walks. In the event of page faults, the IOMMU has to report the event to software. More details can be found in the PCISIG standard under ATS (address translation service) (for example, see generally, PCI Express Address Translation Service 1.1). Under PCIe, the IOTLB is also referred to as the Address Translation Cache (ATC) to differentiate it from the TLB(s) used by the CPU. Optionally, an ATC may be stored separate from the IOTLB, with updates to the ATC being copied to the IOTLB.

New ISA Instructions

Under aspects of some embodiments disclosed herein, new instructions are provided that may be implemented as part of a processor's ISA. The basic idea is that when a CPU thread needs to access an accelerator, the thread submits its request descriptor by writing it to a specific memory address (that has been memory-mapped to the input portal of the accelerator device). The memory address is discovered earlier by the thread by a kernel call that handles discovery/enumeration of accelerators and their functionality.

The thread cannot read/write this memory location by normal load/store instructions, but can only write a descriptor to it and receive an acknowledgement from the device (whether it has been accepted or not) using the special ISA. The hardware of the CPU Core also augments the descriptor payload with additional information such as process/thread-IDs and, importantly, a list of translations as shown below in LISTING 1, which contain pseudocode for implementing the ISA instruction, Enq_with_translations_v1.

The core hardware only lists down the translations that are present in the L1 or L2 TLBs, but does not trigger fetching translations if they are absent. The reason is that most likely the accelerator needs the data but not the core CPU thread.

LISTING 1

```
1.   Enq_with_translations_v1 m64 dest, m64 src, r64 len{
2.   // dest has the address of Accelerator portal to write
3.   // the descriptor
4.   // src has the address of the descriptor from the user
5.   // application of length "len"
6.   // assume descriptor starts with a format:
```

LISTING 1-continued

```
7.   //    num-input-buffers
8.   //    input-buffer1-pointer
9.   //    input-buffer1-size
10.  //    input-buffer2-pointer
11.  //    input-buffer2-size
12.  //    ...
13.  //    num-output-buffers
14.  //    output-buffer1-pointer
15.  //    output-buffer1-size
16.  //    Other payload (e.g., function opcodes, completion records,
17.  // ...) PL
18.
19.  Write <VM#, Process-ID#, Thread#, Core#> to dest
20.  For each input buffer in src {
21.      For (i=0; i< buf-size; i += 4K) {
22.          PA = lookup-TLB-for-virtual-address(buf-pointer +i)
23.          If (PA != NULL) write <buf-pointer +i: PA> to dest
24.      }
25.  }
26.
27.  Write user payload to dest (i.e. memcopy "len" bytes from src ->
28.  dest)
29.  Wait for acknowledgement from Accelerator (possibly after writing
30.  EOF)
31.  Return pass/fail
32.  }
```

The Enq_with_translations_v1 instruction includes three parameters (operands) dest, src, and len, which are respective stored in first and second m64 64-bit registers and an r64 64-bit register. m64 notation means that the operand is a pointer to memory so that content will be used in a load/store instruction. r64 notation means the operand is used as data value. As shown in LISTING 1, dest stores the address of the accelerator portal to which the descriptor is written, while src stores the address of the descriptor from the user application of a length len.

As further shown in lines 6-17, in the embodiment of LISTING 1 the descriptor has a format that includes the number of input buffers, a pointer to each input buffer (e.g., input-buffer1-pointer, input-buffer2-pointer, and the size of each input buffer (as depicted by input-buffer2-size, input-buffer2-size . . . ), the number of output buffers, a pointer and size of each output buffer (as depicted by output buffer1 pointer, output buffer2 size, and other payload information, such as function opcodes, completion records, etc.).

As depicted in lines 19-25, the VM # (Virtual Machine number), Process ID, Thread number, and Core number are written to the dest. The outer for loop (lines 20-25) is used to process each input buffer in src. The inner for loop has an iterator that is the size of a page (4K in this example, noting other page sizes may also be used). Thus, for each page in each buffer, the physical address (PA) is looked-up from a TLB using the virtual address of the current page (virtual address of the buffer pointer plus 'i', which is equal to the page size times of pages offset from the beginning of the buffer). If the result is not NULL, the physical address of the current page is written to the dest.

As further shown by lines 27-28, the user payload is written to dest by performing a memory copy (memcopy) of a length len bytes from the src (register) to the dest (register). The thread then waits for an acknowledgment from the accelerator (line 29), and the returns either pass (processing successful with no errors) or fail (an error occurred), as shown in line 31.

Variations

The basic version of the ISA instruction having the pseudocode shown in LISTING 1 can be extended to lookup translations for both input and output buffers. Note that for things like context/state buffers that are both read and written, the instruction would create a translation for them but the accelerator would hold off writing state until the translation is confirmed.

In the basic form of the enqueue instruction, we only report back success or failure from the accelerator, but nothing else. To enable a low-latency system, we can extend this protocol to have the accelerator return something like a "time-to-service" estimate. This is similar to our experiences joining some sort of queue where we are told that your expected wait time is 'X'. Based on the expected wait time, the thread can decide to wait/poll or swap out. In addition, it can decide to pre-fetch the translations for the output buffers as the CPU thread would need to work on them. Pseudocode corresponding to one embodiment of a variation of the basic instruction of LISTING 1 is shown in LISTING 2.

---

LISTING 2

```
1.  Enq_with_translations_v2 m64 dest, m64 src, r64 len{
2.   // dest has the address of Accelerator portal to write
3.   // the descriptor
4.   // src has the address of the descriptor from the user
5.   // application of length "len"
6.   // assume descriptor starts with a format:
7.   //     num-input-buffers
8.   //     input-buffer1-pointer
9.   //     input-buffer1-size
10.  //     input-buffer2-pointer
11.  //     input-buffer2-size
12.  //     ...
13.  //     num-output-buffers
14.  //     output-buffer1-pointer
15.  //     output-buffer1-size
16.  //     Other payload (e.g., function opcodes, completion records,
17.  //     ...) PL
18.
19.  Write <VM#, Process-ID#, Thread#, Core#> to dest
20.  For each input buffer in src {
21.      For (i=0; i< buf-size; i+= 4K) {
22.          PA = lookup-TLB-for-virtual-address(buf-pointer +i)
23.          If (PA != NULL) write <buf-pointer +i: PA> to dest
24.      }
25.  }
26.
27.  Write user payload to dest (i.e. memcopy "len" bytes from src ->
28.  dest)
29.  Wait for acknowledgement from Accelerator (possibly after writing
30.  EOF)
31.  T = Time-returned from accelerator
32.  If fail return
33.  If (T < some threshold t1){
34.      For each output buffer in src {
35.          For (i=0; i< buf-size; i+= 4K){  // another variation is
36.                                           // for just a few pages
37.              PA = lookup-TLB-for-virtual-address(buf-pointer
                  +i)
38.              If (PA == NULL) start Page Walker to find PA and
39.                  insert into TLB
40.          }
41.      }
42.  } // T > t1 ...
43.  If (T < some threshold t2) mwait else swap-out
44. }
```

---

The Lines 1-30 of LISTING 1 and LISTING 2 are the same (absent the different instruction names). In line 31, the value of the time returned from accelerator is assigned to 'T'. If T is less than a predefined threshold t1 the operations shown in lines 34-41 are performed. For each output buffer in src (line 34), and for each of the pages for that buffer (line 35) a physical address (PA) for the page is looked-up using a TLB in a manner similar to that discussed above. If the PA is NULL, page walking is started to find the physical address and insert it in the TLB. As shown in line 43, if T is less than a second threshold t2, execution of the calling thread waits, otherwise it is swapped out for another thread.

As an option, instead of pre-fetching translations via the page walker, a reverse snoop from the IOTLB for output data translations may be performed.

Accelerator Processing

Figure 6A:
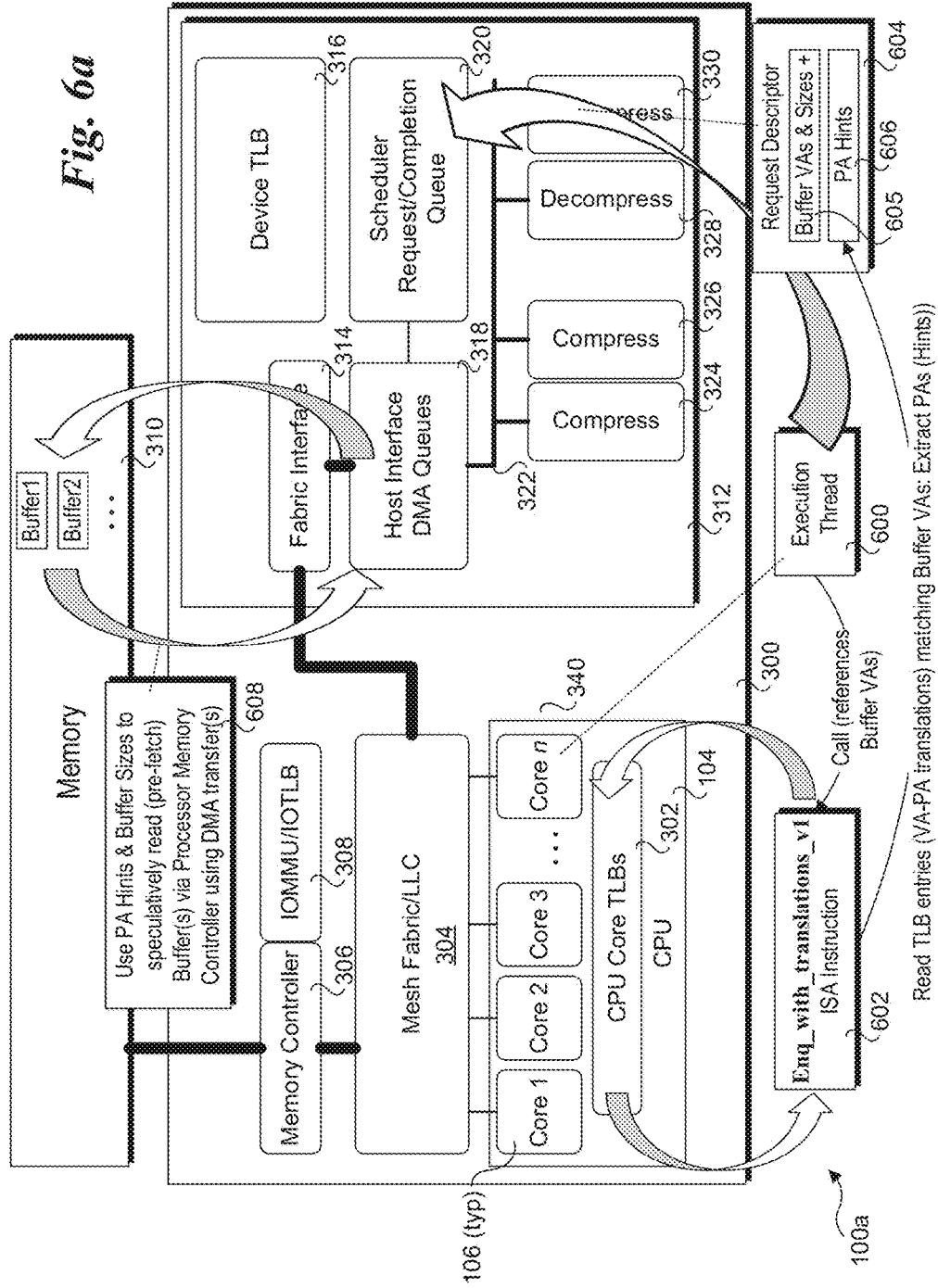
Figure 6B:
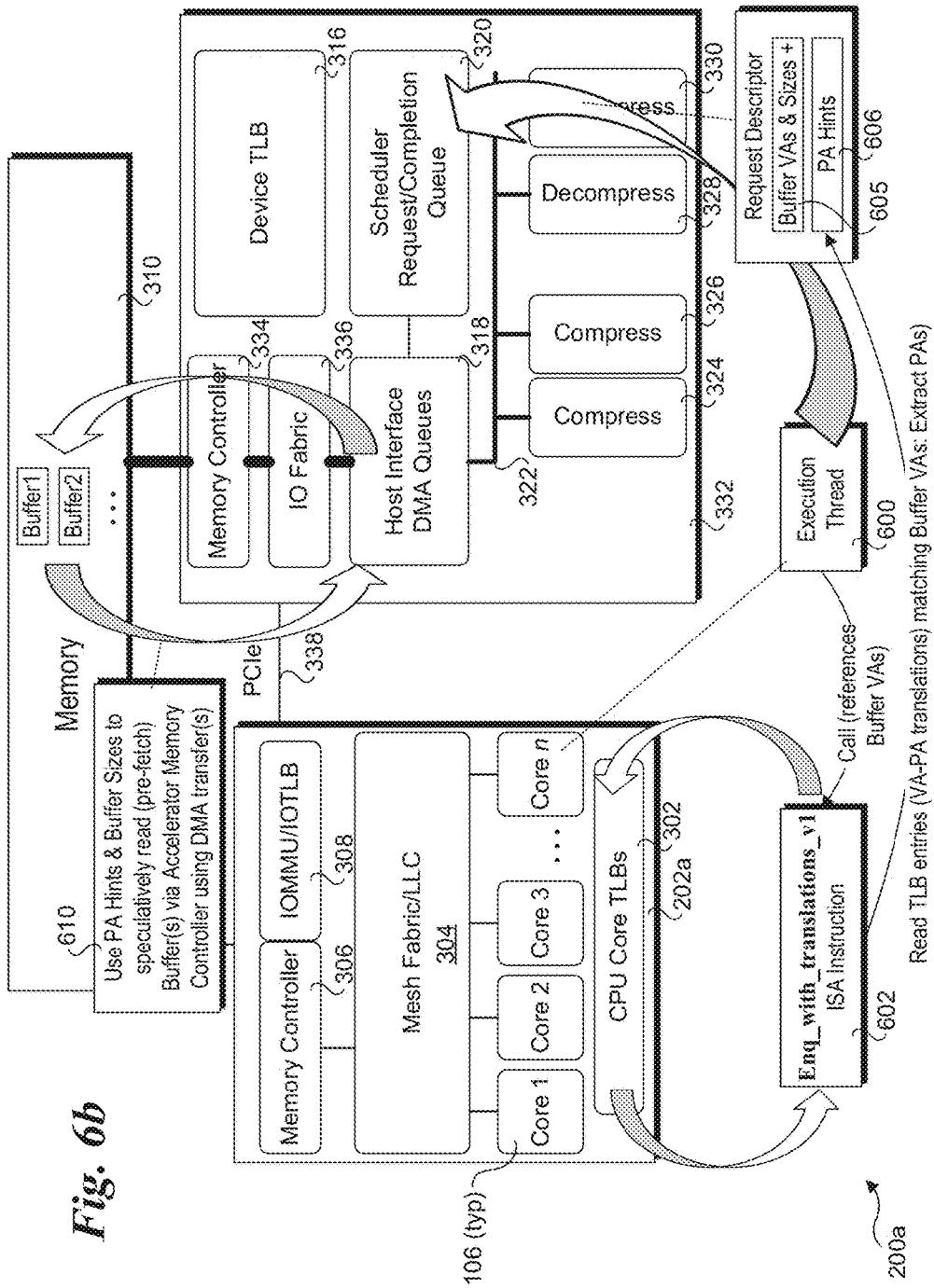
FIG. 6b is a combined schematic and dataflow diagram illustrating one embodiment of an implementation of the Enq_with_translations_v1 instruction using the platform architecture of FIG. 3b.
Figure 7A:
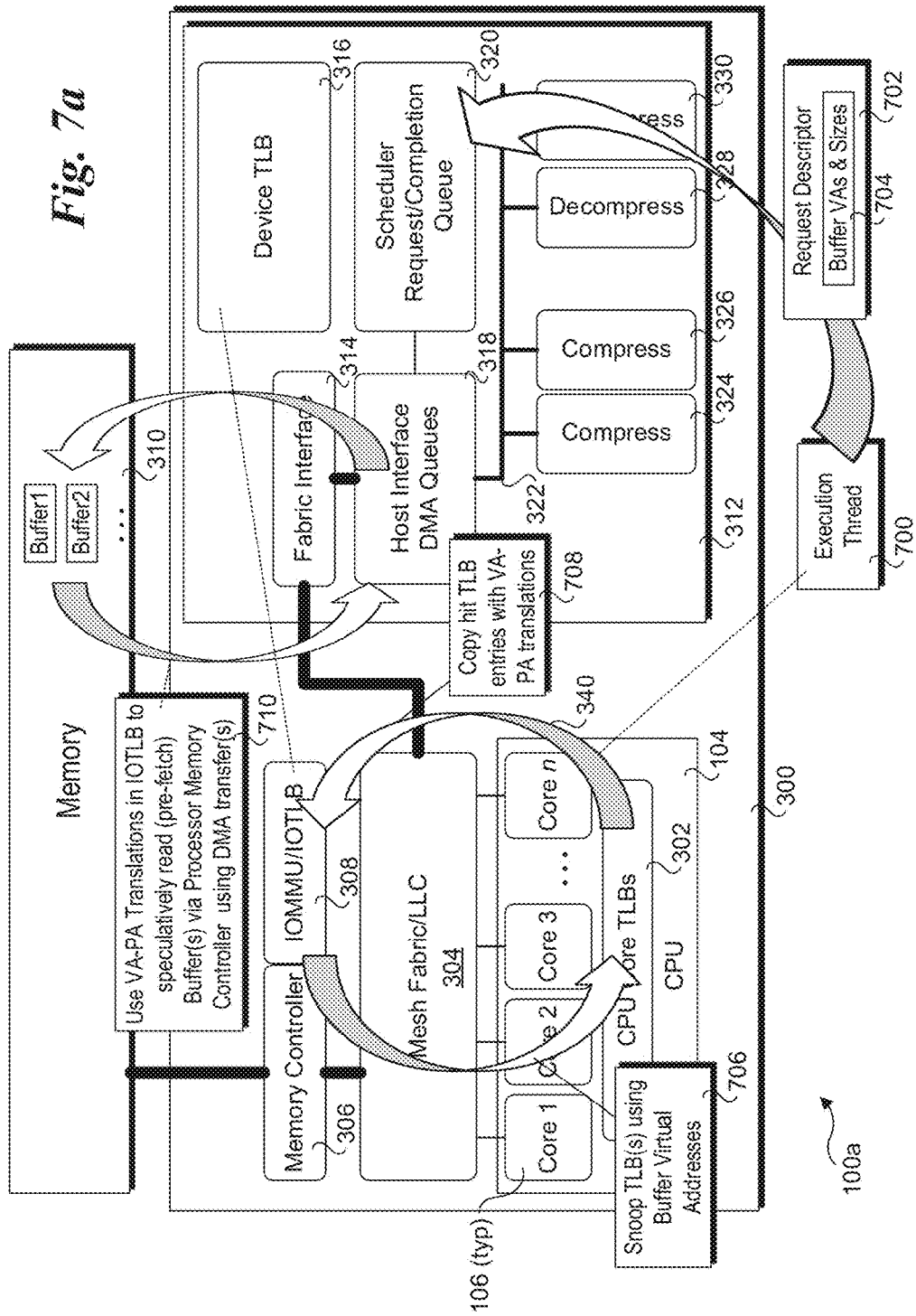
Figure 8:
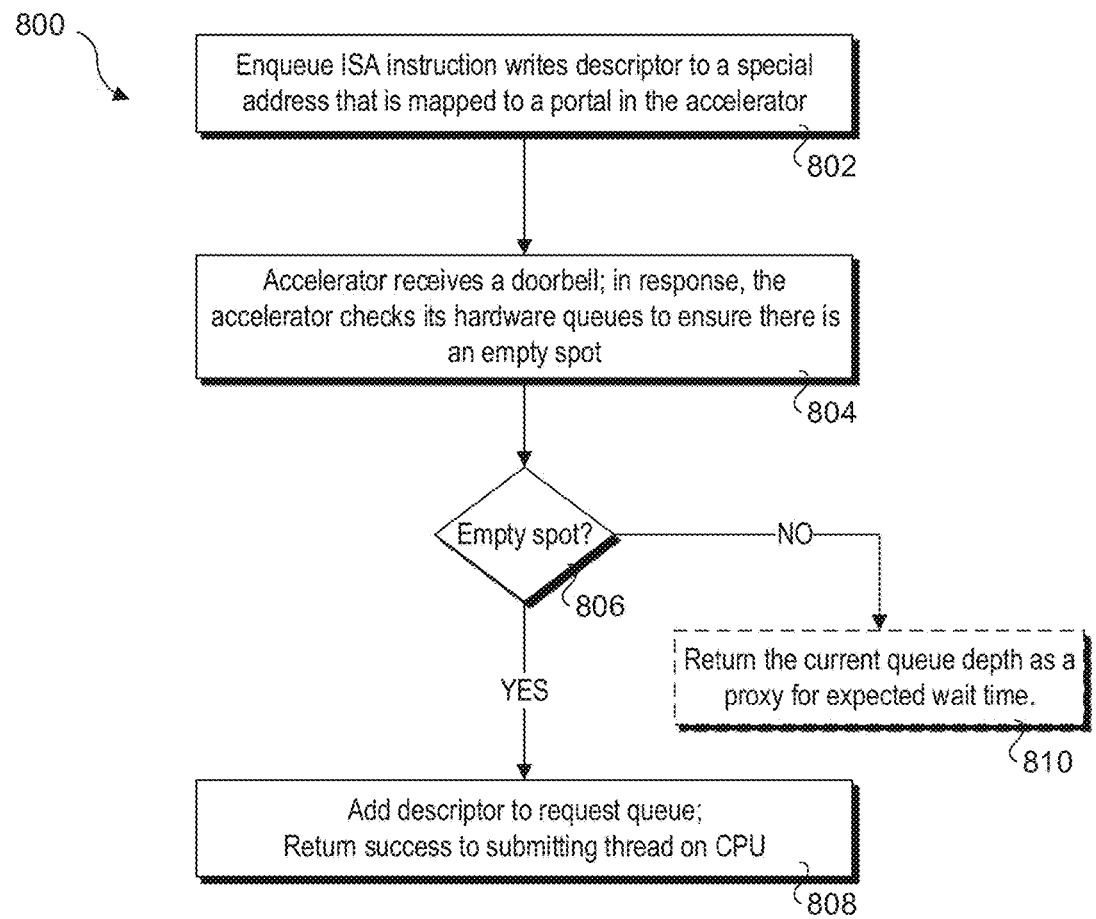
FIG. 8 is a flowchart illustrating operations and logic relating to enqueuing a request descriptor, according to one embodiment.
Figure 9:
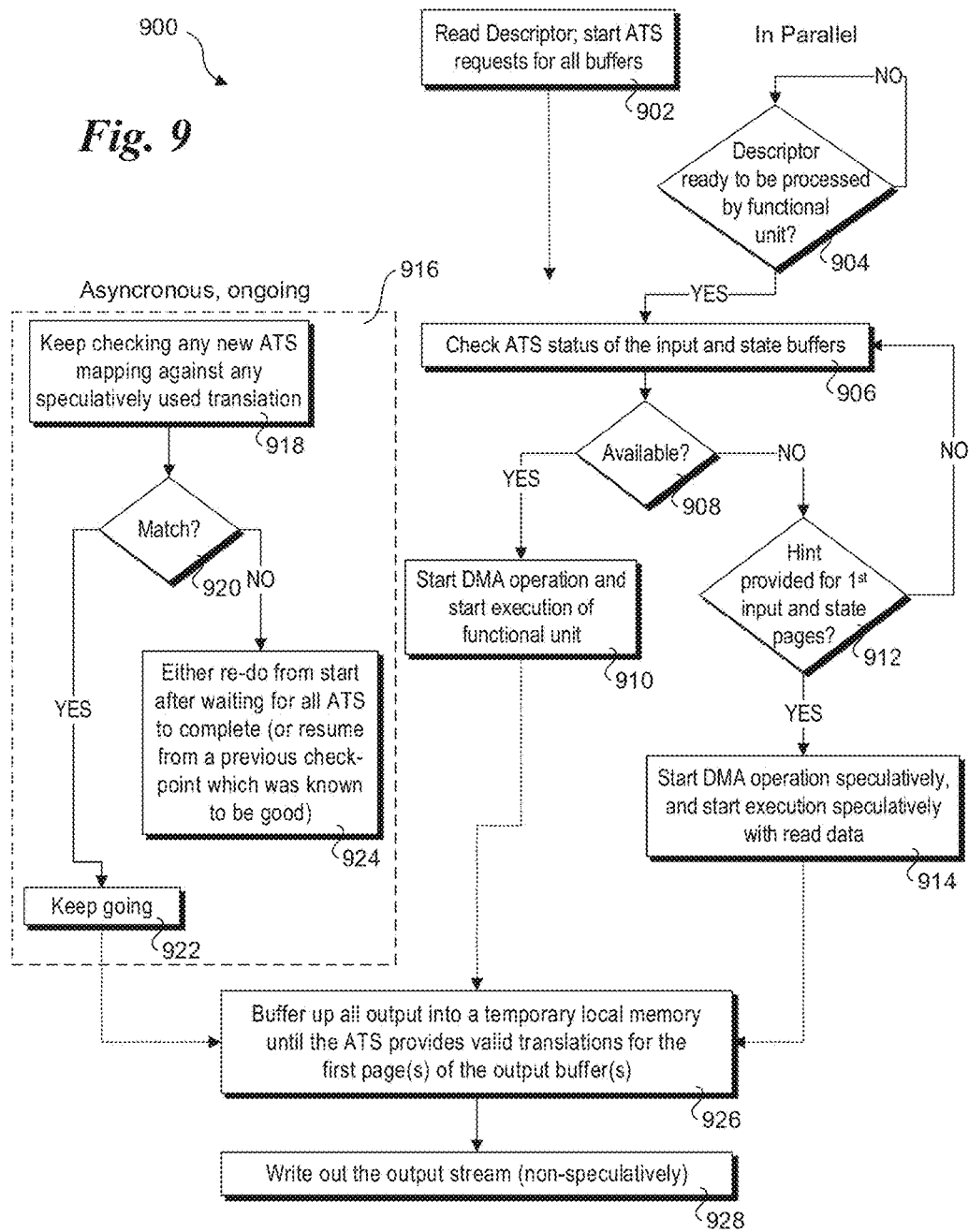
FIG. 9 is a flowchart illustrating operations and logic relating to accelerator processing of a request descriptor, according to one embodiment.

Operations and dataflows for speculative pre-fetching of buffer data in connection with accelerator processing for exemplary on-chip accelerator embodiments are shown in FIGS. 6a and 7a, while corresponding operations and dataflows for exemplary off-chip accelerator embodiments are shown in FIGS. 6b and 7b. In addition, operations and logic corresponding to exemplary embodiments of accelerator processing are shown in flowcharts 800 and 900 of FIGS. 8 and 9.

FIG. 6a shows an implementation of the Enq_with_translations_v1 instruction using platform architecture 100a of FIG. 3a. In this example, an execution thread 600 executing on Core n calls the Enq_with_translations_v1 instruction (depicted in a block 602) with applicable data being loaded into the operands discussed above, including references (e.g., pointers) to the virtual addresses of the buffers. The Enq_with_translations_v1 instruction uses the buffer virtual addresses as inputs to the TLB(s) associated with Core n. For example, in one embodiment use of the data TLB for the L1 cache will be used, while in another embodiment both the data TLB for the L1 cache and the TLB for the L2 cache is used. Using the buffer VAs as lookups, a check is made to whether there is a TLB "hit" or "miss,' wherein a TLB hit means there is a TLB entry comprising a VA-PA translation for the buffer VA, with the Enq_with_translations_v1 instruction returning the physical address (PA) for that VA. As described above in lines 20-25 of LISTING 1, the Enq_with_translations_v1 uses the TLB lookups and returns the PAs for each of the pages in memory used to store each buffer.

The Enq_with_translations_v1 instruction further enqueues a request descriptor 604 in a portal of accelerator 312, as depicted by the request descriptor added to scheduler request/completion queue 320. The request descriptor contains the various parameters shown in LISTING 1, including buffer VAs and sizes 605 plus the translated PAs, which are used as address hints.

In one embodiment, when a request descriptor is enqueued a speculative data retrieval operation is performed to pre-fetch the (presumed) buffer data stored in the memory pages corresponding to PA hints 606 and the buffer sizes using DMA transfers, as shown in a block 608. Under platform architecture 100a, the DMA transfer is facilitated through use of host interface DMA queues 318, fabric interface 314, mesh fabric/LLC 304, processor memory controller 306 and memory 310, as depicted by the bolded connectors in FIG. 6a. Upon the speculative pre-fetching of the buffer data, speculative processing of the buffer data by one or more functional units on accelerator 312 may begin.

FIG. 6b shows an implementation of the Enq_with_translations_v1 instruction using platform architecture 200a of FIG. 3b. As illustrated by like-numbered components and blocks in FIGS. 6a and 6b, the operations performed up to enqueuing request descriptor 604 are the same for both FIGS. 6a and 6b. However, under platform architecture 200a, the DMA access mechanism is different. As depicted in a block 610, the DMA operation is facilitated through the use of the memory controller (334) on-board accelerator 332. As shown by the bolded connectors, the DMA access path includes host interface DMA queues 318, IO fabric 336, memory controller 334, and memory 310. As before, upon the speculative pre-fetching of the buffer data, speculative processing of the buffer data by one or more functional units on accelerator 312 may begin.

FIGS. 7a and 7b illustrate embodiments of schemes that support speculative pre-fetching of buffer data using IOTLB snooping. In a manner similar to that shown in FIGS. 6a and 6b, an execution thread 700 is executing on Core n, and enqueues a request descriptor 702 using the accelerator portal, as depicted by scheduler request/completion queue 320. However, rather than including the physical addresses of the buffers, request descriptor 702 includes the virtual addresses of the buffers.

As before, once request descriptor 702 is enqueue, a speculator pre-fetching and processing of the buffer data is performed using DMA transfers. Under the embodiment of FIG. 7a, the path used for the DMA transfers is the same in FIG. 6a. However, under the IOTLB snooping embodiments, the DMA pre-fetch accesses to memory 310 reference the virtual addresses of the buffers rather than the physical addresses. Since the memory controller uses physical addresses to access memory 310, a VA-PA translation needs to be performed prior accessing the memory. This is facilitated through the use of IOMMU/IOTLB 308. First, the IOTLB is checked to see if an existing TLB entry for the VA results in a hit. If so, the PA that is returned is used to access the memory page for the buffer. If the TLB lookup for IOMMU/IOTLB 308 results in a miss, the IOMMU/IOTLB performs snooping of the TLB(s) associated with Core n using the VA as the TLB lookup, as shown in a block 706. For TLB hits, the corresponding TLB entries (VA-PA translations) are copied from the application Core TLB(s) to IOMMU/IOTLB 308, as shown in a block 708. The applicable memory pages for the buffers in memory 310 may then be accessed using applicable TLB entries in IOMMU/IOTLB 308, as shown in a block 710.

As further depicted in FIGS. 7a and 7b, TLB entries in IOMMU/IOTLB may be copied into device TLB 316. Under this approach, device TLB may be checked for an TLB hit prior to submitting the DMA operation to memory controller 306. If the VA lookup into the device TLB results in hit, the PA from the VA-PA translation for the memory page can be submitted with the DMA access request, thereby eliminating the need to use IOMMU/IOTLB 308.

In one embodiment, IOTLB snooping of the CPU core TLBs 302 is performed in conjunction with associated DMA transfers. In another embodiment, speculative IOTLB snooping may be performed in advance of the DMA transfers. Under this approach, the IOTLB performs speculative pre-caching of current CPU core TLB entries. Depending on the size of the IOTLB and other considerations, such as interconnect bandwidth and latency considerations consumed through use of IOTLB snooping, various approaches to pre-caching may be employed.

FIG. 7b depicts an embodiment of the TLB snooping scheme using platform architecture 200a of FIG. 3b. The request descriptor and its enqueuing operation is the same as shown in FIG. 7a and described above. However, under platform architecture 200a, the DMA access path is via the memory controller (334) on accelerator 332 rather than memory controller 306. Under platform architecture 200a, device TLB 316 is utilized by memory controller 334 for performing VA-PA translations. If the TLB lookup of device TLB 316 results in a miss, snooping by IOMMU/IOTLB is performed in a manner similar to that described for FIG. 7a. Once the physical address for the buffer memory page is available (either from device TLB or read from or snooped by IOMMU/IOTLB), the PA is used by the accelerator memory controller to access the buffer memory pages in memory 310, as depicted in a block 712

In one embodiment, IOTLB TLB entries resulting from IOMMU/IOTLB snoops performed on behalf of an accelerator are copied to the device TLB for the accelerator. Generally, the copying of entries from the IOTLB to a device TLB may be performed in connection with a current DMA operation, or it may be asynchronous to any DMA operation, under which multiple TLB entries may be copied Depending on the particular platform configuration, the platform may include more than one off-chip accelerator. Embodiments that include a combination of off-chip and on-chip accelerators may also be supported. In addition, as illustrated in FIGS. 1 and 2, a platform architecture may include multiple memory controllers, each with its own IOMMU/IOTLB. It is further noted that the IOTLB entries may result from memory access by other IO devices in the platform than accelerators, such as DMA operations used for transferring data between system memory and a NIC.

In addition to the speculative pre-fetching and processing of buffer data, mechanisms are provided for verifying the buffer data that is accessed is actually the correct data. In one embodiment, the buffer data is validated by verifying the physical addresses used for the pre-fetch data are the correct physical addresses. The reason for verifying the physical addresses (and thus the buffer data) is that TLB entries may become stale or otherwise not reflect the actual physical location of a given memory page at a particular point in time. For example, memory buffers may be swapped into and out of physical memory by an operating system (e.g., swapped to disk to effective increase the size of the platform's physical memory). It is also possible that a given VA-PA mapping may change, resulting in the wrong memory page being accessed.

As discussed above, flowcharts 800 and 900 of FIGS. 8 and 9 illustrates operations and logic corresponding to exemplary embodiments of accelerator processing. With reference to flowchart 800 of FIG. 8, a block 802, an enqueue ISA instruction is used to write a descriptor to a special address that is mapped to a portal in the accelerator. The will result in the accelerator receiving a "doorbell" in a block 804. A doorbell or doorbell ring is effectively a signal or that like that is received by the accelerator indicating it has new work to perform. In response to receiving the doorbell, the accelerator checks its hardware queues to ensure there is an empty slot (for the descriptor to be added to a hardware queue).

As depicted by a decision block 806, if there is an empty spot the logic flows to a block 808 in which the descriptor is added to the request queue of the accelerator and success is returned to the thread on the CPU that submitted the descriptor. For example, in the context of the accelerators of FIGS. 3a and 3b, the descriptor is added to (enqueue in) a request descriptor queue in scheduler request/completion queue 320. If there isn't an empty spot, the logic proceeds to a block 810 wherein the accelerator may optionally return a value representing the current queue depth, which is used as a proxy for an expected wait time after which a spot should be available.

At this point the logic proceeds to flowchart 900. As shown in a block 902, as soon as the descriptor is read, ATS requests are started for all of the buffers identified by the descriptor. In parallel, in a decision block 904 a determination is made to whether the descriptor is ready to be processed by a functional unit on the accelerator. If the answer is NO, one or more subsequent checks of decision block 904 will be made after a predetermined delay and/or using a polling scheme. Once the answer is YES, the logic proceeds to a block 906 in which the ATS status of the input and state buffers is checked.

In a decision block 908, a determination to whether the status indicates ATS for the input and state buffers is available. If the answer is YES, the logic proceeds to a block 910 in which a DMA operation is started, along with execution of the functional unit. If the answer to decision block 908 is NO, the logic proceeds to a decision block 912 in which a determination is made to whether a hint is provided with the descriptor for the first input and state pages. If the answer is YES, a DMA operation is started speculatively, along with starting speculative execution of the functional unit with read data. If the answer to decision block 912 is NO, the logic loops back to block 906.

Meanwhile, the operations and logic shown in a dashed box 916 are performed asynchronously, in an ongoing manner. In a block 918, checks are made to detect any new ATS mappings against any speculatively used translation. As discussed above, details of the operation of ATS are defined by the PCISIG standard, (e.g., PCI Express Address Translation Service 1.1).

In a decision block 920 a determination is made to whether there is a match. If the answer is YES, the logic proceeds to a block 922 in which processing is continued. However, if the answer to decision block 920 is NO, either the process is redone from the start after waiting for all the ATS operations to complete, or otherwise processing is resumed from a previous check point that is known to be good.

As further illustrated, each of blocks 922, 910, and 914 asynchronously feed into a block 926. In this block, all of the output is buffered up into a temporary local memory until the ATS provides valid translations for the first page(s) of the output buffer(s). This process is then completed in a block 928, wherein the output stream is written out (non-speculatively).

In some embodiments, the PCIe ATS is accessed by emulating a PCIe device. For example, under embodiments of the on-chip accelerators described here, such as illustrated in FIG. 3a, the accelerator is coupled to the mesh fabric via a fabric interface that does not employ PCIe. To access the PCIe ATS, the accelerator emulates a PCIe device by using PCIe protocol messages that are encapsulated within messages sent via the fabric interface. The mesh fabric interconnect structure includes a PCIe-to-Fabric bridge that is configured to interface a PCIe interconnect with the fabric interconnect. At the bridge, the encapsulated PCIe messages are de-encapsulated and forwarded to an applicable PCIe component on the processor, such as the PCIe root complex.

In one embodiment, each of the foregoing Enq_with_translations_v1 and Enq_with_translations_v2 instructions may be implemented in processors employing an x86 ISA. However, this is merely exemplary and non-limiting, as variants of the foregoing instructions may be implemented on various processor architectures. For example, consider the RISC-style Arm processor. The ARM instructions are generally capable of 3 operands. They have integer scalar instructions that work on general-purpose registers (GPRs) (e.g., 16 or 32 registers), and vector/floating-point instructions that work on 128-bit SIMD (called Neon) registers.

Figure 10:
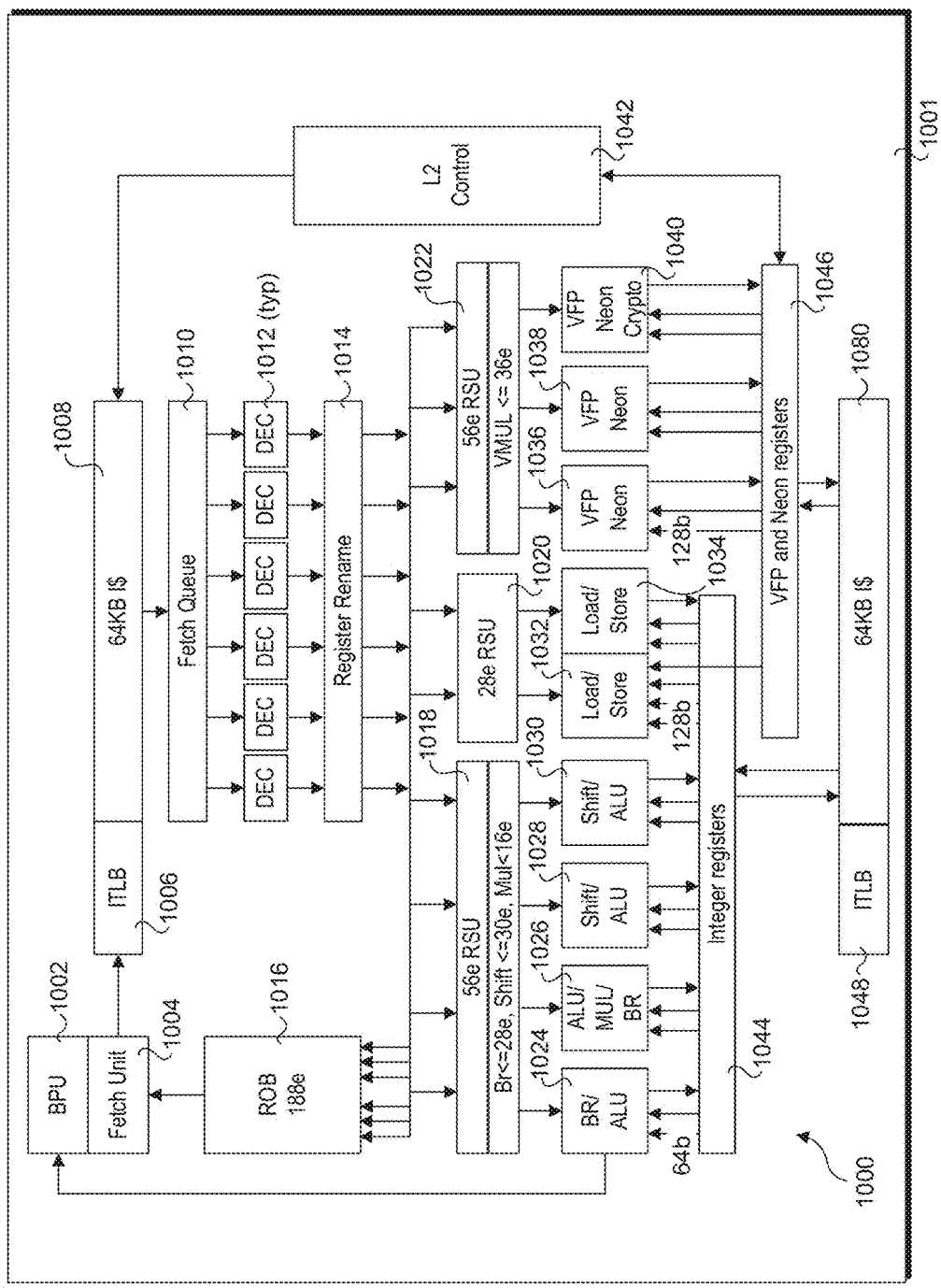
FIG. 10 is a simplified NUMA platform architecture showing various costs for accessing corresponding components including accelerators and memory devices.

An example of one embodiment of an Arm processor microarchitecture 1000, is shown in FIG. 10. Microarchitecture 1000 includes a branch prediction unit (BPU) 1002, a fetch unit 1004, an instruction translation look-aside buffer (ITLB) 1006, a 64 KB (Kilobyte) instruction store 1008, a fetch queue 1010, a plurality of decoders (DECs) 1012, a register rename block 1014, a reorder buffer (ROB) 1016, reservation station units (RSUs) 1018, 1020, and 1022, a branch arithmetic logic unit (BR/ALU) 1024, an ALU/MUL (Multiplier)/BR 1026, shift/ALUs 1028 and 1030, and load/store blocks 1032 and 1034. Microarchitecture 1000 further includes vector/floating-point (VFP) Neon blocks 1036 and 1038, and VFP Neon cryptographic block 1040, an L2 control block 1042, integer registers 1044, 128-bit VFP and Neon registers 1046, an ITLB 1048, and a 64 KB instruction store 1050.

Generally, the each of the Enq_with_translations_v1 and Enq_with_translations_v2 instructions described herein may be implement using embedded logic (e.g., via circuitry), microcode, or a combination of the two. Under an Arm microarchitecture, general-purpose registers may be used for the 64-bit m64 and r64 operands.

Figure 11:
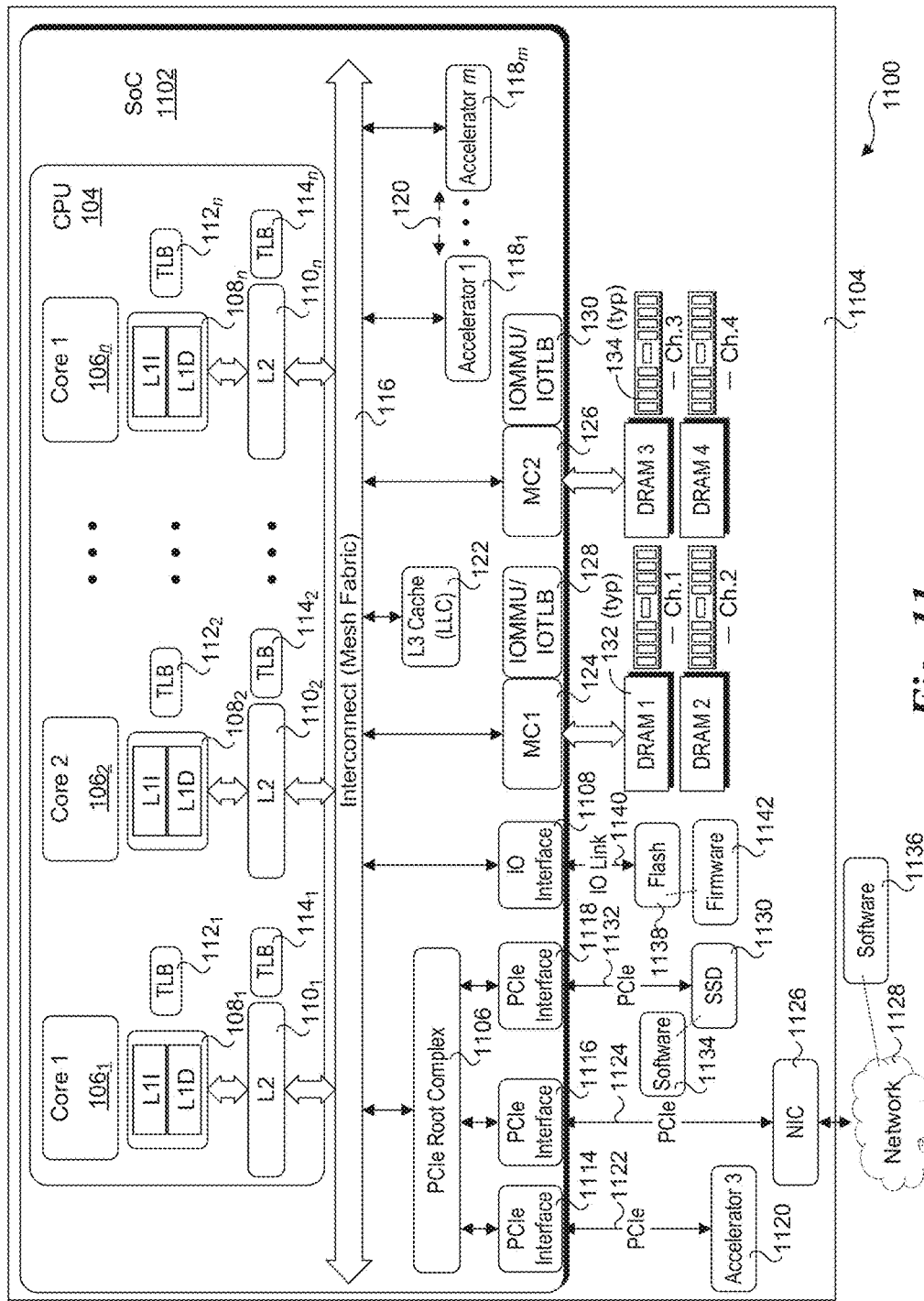
FIG. 11 is a schematic diagram illustrating further details of an exemplary platform architecture, according to one embodiment.

Due to space limitations, the processors 102 and 202 in FIGS. 1 and 2 are shown in simplified form. FIG. 11 shows a platform architecture 1100 showing further details of a processor 1102 and platform components that generally may be included in platform architecture 100 and 200 of FIGS. 1 and 2. Platform architecture 1100 includes a main board 1104 to which various components are mounted and/or otherwise communicatively coupled, including processor 1102. As before, processor 1102 includes a CPU 104 including n processor cores $106_1$-$106_n$ coupled to L1 caches $108_1$-$108_n$ and L2 caches $110_1$-$110_n$. As further illustrated each L1 cache $108_1$-$108_n$ includes both an instruction cache (L1I) and a data cache (L1D), and each of the L1 and L2 caches is associated with a respective translation lookaside buffer (TLB), as illustrated by TLBs $112_1$-$112_n$ for L1 caches $108_1$-$108_n$ and TLBS $114_1$-$114_n$ for L2 caches $110_1$-$110_n$. L2 caches $110_1$-$110_n$ are connected to interconnect 116.

Also connected to interconnect 116 are a PCIe root complex 1106, and L3 cache 122, accelerators $118_1$-$118_m$, an IO interface 1108, and memory controllers 124 and 126 (also labeled MC1 and MC2).

PCIe root complex 1106 will generally be coupled to one or more PCIe interfaces, as depicted by PCIe interfaces 1114, 1116, and 1118. Generally, all or a portion of the PCIe interfaces and PCIe links may be connected to PCIe expansion slots (not shown) mounted on main board 1104. PCIe interface 1114 is depicted as being connected to an off-chip accelerator 1120 via a PCIe link 1122. As discussed above, an off-chip accelerator may comprise an accelerator chip or the like that is either mounted to the platform's main board or installed on an accelerator board or card mounted in a PCIe expansion slot.

PCIe interface 1116 is connected (via a PCIe link 1124) to a NIC 1126 that provides access to a network 1128. Generally, NIC 1126 is representative of various types of network interface adaptors and fabric adaptors, including but not limited to Ethernet adaptors, InfiniBand host controller adaptors (HCAs) and INTEL® OmniPath host fabric interfaces (HFIs).

PCIe interface 1118 is connected to a solid state drive (SSD) 1130 via a PCIe link 1132. Optionally, other types of IO interfaces may be used to enable a processor to communicate with an SSD. As shown, system software 1134 is stored on SSD 1130. The system software may generally include an operating system and one or more application that run on the operating system. The system software may also support various types of virtualized embodiments, including virtualized platforms that implement Type-1 and Type-2 Hypervisors, as well as container-based virtualization environments. As further depicted by software 1136, all or a portion of the system software may be loaded during platform boot over network 1128.

IO interface 1108 is connected to a firmware storage device, such as a flash device 1138 via an IO link 1140. Flash device 1138 stores system firmware 1142, which is loaded as part of the platform's initialization. Generally, various types of firmware may be used depending on the platform, including firmware that employs the Universal Extensible Firmware Interface (UEFI) architecture. All or a portion of the firmware may also be referred to as BIOS (Basic Input Output System), for historical reasons.

Generally, a processor may include one or more memory controllers, each having one or more memory channels connected to one or more memory devices, as discussed above. The embodiment of FIG. 11 includes two memory controllers 124 and 126. Memory controller 124 is coupled to memory devices DRAM 1 and DRAM 2 via respective memory channels 1 and 2. Memory controller 126 is coupled to memory devices DRAM 3 and DRAM 4 via respective memory channels 3 and 4.

In addition to an off-chip accelerator having a memory controller and being configured to directly access system memory via the memory controller, off-chip accelerators may not include a memory controller and access the system memory through DMA operations forwarded through the processor via a memory controller on the processor. For example, one or more accelerators may be installed in an expansion card or board installed in a PCIe expansion slot. From an architecture standpoint, each of the accelerators on the card or board operate as a PCIe device. However, since the PCIe links connecting the processor to a PCIe expansion slots are not coupled to system memory, PCIe devices on card or boards installed in PCIe expansion slots cannot access system memory directly, and thus use the foregoing DMA operations.

Further aspects of the subject matter described herein are set out in the following numbered clauses:

1. A method performed on a computing platform having a multi-core processor coupled to one or more memory devices comprising system memory implemented as shared virtual memory (SVM), the multi-core processor having a plurality of cores, each core associated with at least one translation lookaside buffer (TLB), the multi-core processor further including at least one memory controller operatively coupled via at least one memory channel to one or more memory devices, the computing platform further including one or more SVM-capable accelerators having one or more functional units, the method comprising:

enqueuing, via execution of an execution thread on one of the plurality of cores, a request descriptor for an accelerator, the request descriptor defining a job to be performed by the accelerator and including information associated with one or more buffers in the system memory to be accessed by the accelerator during processing of the request descriptor;

speculatively pre-fetching buffer data from the system memory though use of the information in the request descriptor associated with the one or more buffers;

speculatively starting processing of the job by processing at least a portion of the buffer data that is pre-fetched using one or more functional units of the accelerator; and verifying whether or not the buffer data that is speculatively pre-fetched is the correct buffer data to be processed by the job.

2. The method of clause 1, wherein the information associated with the one or more buffers in the system memory comprises a virtual address, a size, and an address hint for each of the one or more buffers, the method further comprising:

for each of the one or more buffers,
    using the address hint for the buffer to speculatively pre-fetch buffer data for the buffer.

3. The method of clause 2, wherein the address hint for each of the one or more buffers comprises:

a physical address for at least a first page of one or more memory pages containing data corresponding to the buffer; or
    a virtual address to physical address (VA-PA) translation for at least the first page of one or more memory pages containing data corresponding to the buffer.

4. The method of clause 2, wherein the address hint for each of the one or more buffers is obtained through the use of an instruction set architecture (ISA) instruction in the execution thread executed by the processor core.

5. The method of clause 4, wherein execution of the ISA instruction by the processor core causes the processor to:

for each of the one or more buffers,
    use the virtual address of the buffer as a TLB lookup into one or more TLB s associated with the processor core, the TLB lookup returning a physical memory address comprising a hint.

6. The method of clause 1, the information associated with the one or more buffers in system memory comprises a virtual address and a size of each of the one or more buffers, the method further comprising:

for each of the one or more buffers,
    using the virtual address of the buffer as a TLB lookup into one or more TLBs associated with the core executing the thread, the TLB lookup identifying at least one of a physical memory address comprising a hint or a virtual address to physical address (VA-PA) translation comprising a hint; and
    speculatively pre-fetching buffer data for the buffer using the hint.

7. The method of any of clauses 2-6, further comprising:

translating, for each of the one or more buffers, the virtual address for the buffer to a physical address to obtain a currently valid physical address for the buffer; and
    verifying, for each of the one or more buffers, the address hint for the buffer with the currently valid physical address for the buffer.

8. The method of clause 7, wherein translating a virtual address for a buffer to a physical address for the buffer is facilitated through use of a Peripheral Component Interconnect Express (PCIe) Address Translation Service.

9. The method of clause 8, further comprising:

assessing the PCIe Address Translation Service by emulating a PCIe device.

10. The method of any of the preceding clauses, wherein it is verified that the buffer data that is speculatively pre-fetched is the correct buffer data to be processed by the job, further comprising:

continuing processing of the job by processing all of the buffer data that is pre-fetched using one or more functional units of the accelerator.

11. A computer system, comprising:

a multi-core processor, including:
    a plurality of processor cores, each processor core having at least one associated translation lookaside buffer (TLB), each TLB to store a plurality of TLB entries comprising a virtual address to physical address (VA-PA) translation;

an interconnect fabric, communicatively coupled to each processor core and each TLB associated with each processor core;

a memory controller, communicatively coupled to the interconnect fabric and having one or more memory channels;

an input-output (TO) interface, communicatively coupled to the interconnect fabric; and an IOTLB to store a plurality of TLB entries comprising VA-PA translations for one or more IO devices;

system memory comprising one or more memory devices, each communicatively coupled to at least one memory channel of the memory controller;

a shared virtual memory (SVM)-capable accelerator having one or more functional units, either embedded on the processor or communicatively coupled to the processor via the IO interface;

wherein the system is configured to, enqueue, via execution of an execution thread on one of the plurality of cores, a request descriptor for the accelerator, the request descriptor defining a job to be performed by the accelerator and including information associated with one or more buffers in system memory to be accessed by the accelerator during processing of the request descriptor;

speculatively pre-fetch buffer data from the system memory though use of the information in the request descriptor associated with the one or more buffers;

speculatively start processing of the job by processing at least a portion of the buffer data that is pre-fetched using one or more functional units of the accelerator; and verify whether or not the buffer data that is speculatively pre-fetched is the correct buffer data to be processed by the job.

12. The computer system of clause 11, wherein the information associated with the one or more buffers in the system memory comprises a virtual address, a size, and an address hint for each of the one or more buffers, wherein the system is further configured to:

for each of the one or more buffers, employ the address hint for the buffer to speculatively pre-fetch buffer data for the buffer.

13. The computer system of clause 12, wherein the address hint for each of the one or more buffers comprises:

a physical address for at least a first page of one or more memory pages containing data corresponding to the buffer; or a virtual address to physical address (VA-PA) translation for at least the first page of one or more memory pages containing data corresponding to the buffer.

14. The computer system of clause 12 or 13, wherein each of the processor cores has an instruction set architecture (ISA), and wherein the address hint for each of the one or more buffers is obtained through the use of an ISA instruction in the execution thread executed by the processor core.

15. The computer system of clause 14, wherein execution of the ISA instruction by the processor core causes the processor to:

for each of the one or more buffers, use the virtual address of the buffer as a TLB lookup into one or more TLBs associated with the processor core, the TLB lookup returning a physical memory address comprising a hint.

16. The computer system of any of clauses 12-15, wherein the system is further configured to:

translate, for each of the one or more buffers, the virtual address for the buffer to a physical address to obtain a currently valid physical address for the buffer; and verify, for each of the one or more buffers, the address hint for the buffer with the currently valid physical address for the buffer.

17. The computer system of clause 16, wherein the IO interface comprises a Peripheral Component Interconnect Express (PCIe) interface and wherein the processor includes a PCIe root complex coupled to the interconnect fabric and coupled to PCIe interface and the processor is configured to support PCIe Address Translation Service (ATS), and wherein translating a virtual address for a buffer to a physical address for the buffer is facilitated through use of the PCIe ATS.

18. The computer system of clause 11, wherein the information associated with the one or more buffers in system memory comprises a virtual address and a size of each of the one or more buffers, and wherein the system is further configured to:

for each of the one or more buffers, use the virtual address of the buffer as a TLB lookup into one or more TLBs associated with the core executing the thread, the TLB lookup identifying at least one of a physical memory address comprising a hint or a virtual address to physical address (VA-PA) translation comprising a hint; and speculatively pre-fetch buffer data for the buffer using the hint.

19. The computer system of clause 18, wherein the system is further configured to:

translate the virtual address for each of the one or more buffers to a physical address to obtain a currently valid physical address; and verify, for each of the one or more buffers, the hint for that buffer with the currently valid physical address for that buffer.

20. The computer system of any of clauses 11-19, wherein in response to verifying that the buffer data that is speculatively pre-fetched is the correct buffer data to be processed by the job, the system is further configured to continue processing of the job by processing all of the buffer data that is pre-fetched using one or more functional units of the accelerator.

21. A multi-core processor comprising:

a plurality of processor cores, each processor core having at least one associated translation lookaside buffer (TLB), each TLB to store a plurality of TLB entries comprising a virtual address to physical address (VA-PA) translation;

an interconnect fabric, communicatively coupled to each processor core and each TLB associated with each processor core;

a memory controller, communicatively coupled to the interconnect fabric and having one or more memory channels;

an accelerator, communicatively couple to the interconnect fabric, having one or more functional units and at least one of a request queue and a portal, wherein the multi-core processor is configured to be installed in a computer system including system memory comprising one or more memory devices coupled to the one or more memory channels when the processor is installed in the computer system, the computer system employing a shared virtual memory (SVM) architecture, and wherein each processor core has an instruction set architecture (ISA) including an instruction that upon execution, causes the processor to:

one of write a request descriptor to the accelerator portal or enqueue a request descriptor in the accelerator request queue, the request descriptor defining a job to be performed by the accelerator and including an address hint for each of one or more buffers in system memory to be accessed by the accelerator during processing of the request descriptor, wherein the address hint for a buffer is to be employed by the processor to speculatively pre-fetch buffer data corresponding to the buffer from the system memory.

22. The multi-core processor of clause 21, wherein the multi-core processor is further configured to:

in response enqueuing the request descriptor in the accelerator request queue, employ the address hint for each of the one or more buffers to speculatively pre-fetch buffer data from the system memory for that buffer;

speculatively start processing the job defined by the request descriptor by processing at least a portion of the buffer data that is pre-fetched using one or more functional units of the accelerator; and verify whether or not the buffer data that is speculatively pre-fetched is the correct buffer data to be processed by the job.

23. The multi-core processor of clause 21 or 22, wherein the ISA instruction includes a first operand to store an address of the accelerator portal to write a request descriptor to in a first register, a second operand to store an address of the request descriptor from a user application running in the system memory in a second register, and a third operand to store a length of the request descriptor in third register.

24. The multi-core processor of clause 23, wherein execution of the ISA instruction by a processor core causes the processor to:

extract data from the request descriptor identifying a virtual address of each of one or more buffers;

for each of the one or more buffers, use the virtual address of the buffer as a TLB lookup into one or more TLBs associated with the processor core, the TLB lookup returning a physical memory address comprising a hint; and update the request descriptor to include the hint.

25. The multi-core processor of clause 24, wherein at least one of the buffers includes data stored in multiple pages in the system memory, and wherein execution of the ISA instruction by a processor core causes the processor to:

update the request descriptor with a physical memory address for each of the multiple pages for each buffer that includes data stored in multiple pages in the system memory.

26. The multi-core processor of clause 24 or 25, wherein the request descriptor identifies virtual addresses for one or more input buffers and one or more output buffers, and execution of the instruction causes the processor to generate one or more hints for each of the one or more input buffers but does not generate a hint for any of the one or more output buffers.

27. The multi-core processor of clause 24 or 25, wherein the request descriptor identifies virtual addresses for one or more input buffers and one or more output buffers, and execution of the instruction causes the processor to generate one or more hints for each of the one or more input buffers and each of the one or more output buffers.

28. The multi-core processor of clause 24 or 25, wherein the request descriptor identifies virtual addresses for one or more input buffers and one or more output buffers, and execution of the instruction causes the processor to:

generate one or more hints for each of the one or more input buffers;

send information to the accelerator;

receive a time value from the accelerator;

if the time value is less than a threshold, generate one or more hints for each of the one or more output buffers.

29. The multi-core processor of any of clauses 22-28, wherein the accelerator further includes a device TLB, and the processor is further configured to add a new VA-PA translation to the device TLB in connection with at least one of accessing a physical address via a hint and verifying a VA-PA translation associated with a hint.

30. The multi-core processor of any of clauses 22-29, wherein the accelerator is further configured to access the system memory using direct memory access (DMA) operations.

31. The multi-core processor of clause 30, wherein the accelerator further includes a plurality of DMA queues.

32. The multi-core processor of any of clauses 21-31, further comprising an input-output memory management unit (IOMMU) coupled to the memory controller.

33. The multi-core processor of any of clauses 21-32, wherein the processor is further configured to:

translate, for each of the one or more buffers, a virtual address for the buffer to a physical address to obtain a currently valid physical address for the buffer; and verify, for each of the one or more buffers, the address hint for the buffer with the currently valid physical address for the buffer.

34. The multi-core processor of clause 33, wherein translating a virtual address for a buffer to a physical address for the buffer is facilitated through use of a Peripheral Component Interconnect Express (PCIe) Address Translation Service.

35. The multi-core processor of clause 34, wherein the accelerator is enabled to access the PCIe Address Translation Service by emulating a PCIe device.

36. The multi-core processor of any of clauses 22-35, further comprising an input-output translation look-aside buffer (IOTLB), wherein the multi-core processor is configured to add a VA-PA translation to the IOTLB in connection with at least one of generating a VA-PA translation associated with a hint and verifying a VA-PA translation associated with a hint.

37. A multi-core processor comprising:

a plurality of processor cores, each processor core having at least one associated translation lookaside buffer (TLB), each TLB to store a plurality of TLB entries comprising a virtual address to physical address (VA-PA) translation;

an interconnect fabric, communicatively coupled to each processor core and each TLB associated with each processor core;

a memory controller, communicatively coupled to the interconnect fabric and having one or more memory channels;

an input-output (TO) interface;

an accelerator, communicatively couple to the interconnect fabric, having one or more functional units and a request queue, wherein the multi-core processor is configured to be installed in a computer system including system memory comprising one or more memory devices coupled to the one or more memory channels and a shared virtual memory (SVM)-capable accelerator coupled to the IO interface when the processor is installed in the computer system, the computer system employing a shared virtual memory architecture, and wherein each processor core has an instruction set architecture (ISA) including an instruction that upon execution, causes the processor to:

send a request descriptor to the accelerator via the IO interface, the request descriptor defining a job to be performed by the accelerator and including an address hint for each of one or more buffers in system memory to be accessed by the accelerator during processing of the request descriptor, wherein the address hint for a buffer is to be employed by the accelerator to speculatively pre-fetch buffer data corresponding to the buffer from the system memory.

38. The multi-core processor of clause 37, wherein the ISA instruction includes a first operand to store an address of a portal on the accelerator to write a request descriptor to in a first register, a second operand to store an address of the request descriptor from a user application running in the system memory in a second register, and a third operand to store a length of the request descriptor in third register.

39. The multi-core processor of clause 38, wherein execution of the ISA instruction by a processor core causes the processor to:

extract data from the request descriptor identifying a virtual address of each of one or more buffers;

for each of the one or more buffers, use the virtual address of the buffer as a TLB lookup into one or more TLBs associated with the processor core, the TLB lookup returning a physical memory address comprising a hint; and update the request descriptor to include the hint.

40. The multi-core processor of clause 39, wherein at least one of the buffers includes data stored in multiple pages in the system memory, and wherein execution of the ISA instruction by a processor core causes the processor to:

update the request descriptor with a physical memory address for each of the multiple pages for each buffer that includes data stored in multiple pages in the system memory.

41. The multi-core processor of clause 39 or 40, wherein the request descriptor identifies virtual addresses for one or more input buffers and one or more output buffers, and execution of the instruction causes the processor to generate one or more hints for each of the one or more input buffers but does not generate a hint for any of the one or more output buffers.

42. The multi-core processor of clause 39 or 40, wherein the request descriptor identifies virtual addresses for one or more input buffers and one or more output buffers, and execution of the instruction causes the processor to generate one or more hints for each of the one or more input buffers and each of the one or more output buffers.

43. The multi-core processor of clause 39 or 40, wherein the request descriptor identifies virtual addresses for one or more input buffers and one or more output buffers, and execution of the instruction causes the processor to:

generate one or more hints for each of the one or more input buffers;

send information to the accelerator;

receive a time value from the accelerator;

if the time value is less than a threshold, generate one or more hints for each of the one or more output buffers.

44. The multi-core processor of any of clauses 34-37, wherein the accelerator is configured to:

employ the address hint for each of the one or more buffers to speculatively pre-fetch buffer data from the system memory for that buffer;

speculatively start processing the job defined by the request descriptor by processing at least a portion of the buffer data that is pre-fetched using one or more functional units of the accelerator, and wherein the multi-core processor is further configured to, receive an address translation request from the accelerator including a virtual address for each of the one or more buffers for which a hint is employed to speculatively pre-fetch data;

translating the virtual address to a physical address to generate a VA-PA translation; and return the VA-PA translation to the accelerator for each address translation request.

45. The multi-core processor of clause 44, wherein the IO interface comprises a Peripheral Component Interconnect Express (PCIe) interface, and wherein translating the virtual address to the physical address is facilitated through use of a PCIe Address Translation Service.

46. The multi-core processor of any of clauses 44 or 45, further comprising an input-output translation look-aside buffer (IOTLB) to store a plurality of TLB entries comprising VA-PA translations for one or more IO devices including the accelerator, wherein the multi-core processor is configured to add a VA-PA translation to the IOTLB in connection with generating a VA-PA translation.

47. An shared virtual memory (SVM)-capable accelerator comprising:

an input-output (TO) interface;

a first memory controller;

a portal; and one or more functional units;

wherein the accelerator is configured to be installed in a computer system including a multi-core processor having a plurality of processor cores and a second memory controller coupled to system memory comprising one or more memory devices, wherein each of the processor cores is associated with one or more translation look-aside buffers (TLBs), the computer system employing a shared virtual memory architecture, wherein when installed in the computer system the accelerator is coupled to the multi-core processor via the IO interface and the first memory controller of the accelerator is coupled to at least one of the one or more memory devices, and wherein the accelerator is configured, when installed in the computer system, to:

receive a request descriptor from an execution thread executing on one of the processor cores of the multi-core processor, the request descriptor defining a job to be performed by the accelerator and including information associated with one or more buffers in system memory to be accessed by the accelerator during processing of the request descriptor;

speculatively pre-fetch buffer data from the system memory though use of the information in the request descriptor associated with the one or more buffers; and speculatively start processing of the job by processing at least a portion of the buffer data that is pre-fetched using one or more functional units of the accelerator.

48. The SVM-capable accelerator of clause 47, further configured to verify whether or not the buffer data that is speculatively pre-fetched is the correct buffer data to be processed by the job.

49. The SVM-capable accelerator of clause 47 or 48, wherein the information associated with the one or more buffers in system memory comprises a virtual address, a size, and an address hint for each of the one or more buffers, further configured to:

for each of the one or more buffers, employ the address hint for the buffer to speculatively pre-fetch buffer data for the buffer.

50. The SVM-capable accelerator of clause 49, wherein the address hint for each of the one or more buffers comprises:

a physical address for at least a first page of one or more memory pages containing data corresponding to the buffer; or a virtual address to physical address (VA-PA) translation for at least the first page of one or more memory pages containing data corresponding to the buffer.

51. The SVM-capable accelerator of clause 47, wherein the information associated with the one or more buffers in system memory comprises a virtual address and a size of each of the one or more buffers and the request descriptor includes information identifying a processor core executing a thread that generates the request descriptor, wherein the SVM-capable accelerator is further configured to:

for each of the one or more buffers, use the virtual address of the buffer as a TLB lookup into one or more TLB s associated with the core executing the thread, the TLB lookup identifying at least one of a physical memory address comprising a hint or a virtual address to physical address (VA-PA) translation comprising a hint; and speculatively pre-fetch buffer data for the buffer using the hint.

52. The SVM-capable accelerator of any of clauses 47-51, further comprising a device TLB in which a plurality of VA-PA translations are to be stored, wherein the accelerator is configured to employ the device TLB to facilitate access to the system memory.

53. The SVM-capable accelerator of clause 52, wherein the accelerator is configured to receive a VA-PA translation from the multi-core processor and one of update an existing TLB entry in the device TLB with the VA-PA translation that is received or add a new TLB entry in the device TLB with the VA-PA translation that is received.

54. The SVM-capable accelerator of any of clauses 49-53, further configured to:

send an address translation request to the multi-core processor including a virtual address for each of the one or more buffers for which a hint is employed to speculatively pre-fetch data;

receive a VA-PA translation from the multi-core processor for each address translation request; and for each hint, validate the hint by comparing the VA-PA translation received from multi-core processor.

55. The SVM-capable accelerator of clause 54, wherein the IO interface comprises a Peripheral Component Interconnect Express (PCIe) interface and the multi-core processor is configured to implement a PCIe Address Translation Service, and wherein the address translation service require comprises a PCIe Address Translation Service request.

56. The SVM-capable accelerator of any of clauses 47-55, further comprising a request queue, wherein in response to receiving the request descriptor, the accelerator enqueues the request descriptor in the request queue.

57. The SVM-capable accelerator of clause 56, further configured to:

receive a doorbell indicating a request descriptor has been received;

check the request queue to determine whether there is an empty spot; and add the request descriptor if there is an empty spot.

58. The SVM-capable accelerator of clause 57, wherein the accelerator is further configured to return a current queue depth to the execution thread if it is determined that there is not an empty spot.

59. A method performed on a computing platform having a multi-core processor coupled to one or more memory devices comprising system memory implemented as shared virtual memory (SVM), the multicore processor having a plurality of cores, each core having a first and second level cache and associated with at least one translation lookaside buffer (TLB), the multi-core processor further including at least one memory controller operatively coupled via at least one memory channel to the one or more memory devices, the computing platform further including one or more SVM-capable accelerators, each having a device TLB and including one or more functional units configured to perform at least one function, the method comprising:

enqueuing, via execution of a thread on one of the plurality of cores, a request descriptor for an accelerator, the request descriptor defining a job to be performed by the accelerator and identifying virtual addresses for a plurality of buffers stored in the system memory to be accessed by the accelerator during processing of the request descriptor;

speculatively starting processing of the job by, for each of one or more buffers of the plurality of buffers, identifying a speculative VA-PA translation having a virtual address corresponding to the buffer and performing a direct memory access (DMA) operation using the physical address from that speculative VA-PA translation to read data from the system memory that speculatively corresponds to that buffer; and starting processing the data that is read from the one or more buffers using one or more functional units on the accelerator.

60. The method of clause 59, further comprising:

in parallel with speculatively starting processing of the job, translating the virtual address for each of the one or more buffers to a physical address to create a currently valid VA-PA translations; and verifying the speculative VA-PA translations by comparing, for each of the one or more buffers, the speculative VA-PA translation for that buffer with the currently valid VA-PA translation for that buffer.

61. The method of clause 59 or 60, further comprising:

copying the speculative (VA-PA) translations from the TLB associated with the core; and providing the copy of the speculative VA-PA translations with the request descriptor.

62. The method of clause 59, further comprising:

identifying respective virtual addresses in the request descriptor for the one or more buffers request descriptor; and snooping the TLB associated with the core using the respective virtual addresses to obtain the copy of the speculative VA-PA translations from the TLB.

63. The method of any of clauses 1-10 and 59-62, further comprising:

in response to enqueing the request descriptor at the accelerator, reading the request descriptor; and starting address translation service (ATS) requests for all of the plurality of buffers.

64. The method of clause 63, further comprising:

determining whether the descriptor is ready to be processed by a functional unit on the accelerator.

65. The method of clause 64, wherein it is determined the descriptor is ready to be processed by a functional unit on the accelerator and wherein the plurality of buffers include input and status buffers, further comprising:

checking the ATS status of an input or status buffer;

if the ATS status indicates the address translation for the input or status buffer is available, starting a direct memory access (DMA) operation to access the input or status buffer and start execution of the functional unit;

otherwise, if the ATS status indicates the address translation for the input or status buffer is not available, speculatively starting, using one of the virtual-to-physical address translations provided in the request descriptor, a DMA operation under which the accelerator reads data in the system memory that speculatively corresponds to the input or status buffer; and speculatively starting execution of the functional unit to perform an accelerator function that operates on the data that is read.

66. A computer system, comprising:

a multi-core processor, including:

a plurality of processor cores, each processor core having at least one associated translation lookaside buffer (TLB), each TLB to store a plurality of TLB entries comprising a virtual address to physical address (VA-PA) translation;

an interconnect fabric, communicatively coupled to each processor core and each TLB associated with each processor core;

a memory controller, communicatively coupled to the interconnect fabric and having one or more memory channels;

an input-output (TO) interface, communicatively coupled to the interconnect fabric; and an IOTLB to store a plurality of TLB entries comprising VA-PA translations for one or more IO devices;

system memory comprising one or more memory devices, each communicatively coupled to at least one memory channel of the memory controller;

a shared virtual memory (SVM)-capable accelerator having one or more functional units, either embedded on the processor or communicatively coupled to the processor via the IO interface;

wherein the system further comprises means for, enqueuing, via execution of an execution thread on one of the plurality of cores, a request descriptor for the accelerator, the request descriptor defining a job to be performed by the accelerator and including information associated with one or more buffers in system memory to be accessed by the accelerator during processing of the request descriptor;

speculatively pre-fetching buffer data from the system memory though use of the information in the request descriptor associated with the one or more buffers;

speculatively starting processing of the job by processing at least a portion of the buffer data that is pre-fetched using one or more functional units of the accelerator; and verifying whether or not the buffer data that is speculatively pre-fetched is the correct buffer data to be processed by the job.

67. The computer system of clause 66, wherein the information associated with the one or more buffers in the system memory comprises a virtual address, a size, and an address hint for each of the one or more buffers, wherein the system further comprises means for:

for each of the one or more buffers, employing the address hint for the buffer to speculatively pre-fetch buffer data for the buffer.

68. The computer system of clause 67, wherein the address hint for each of the one or more buffers comprises:

a physical address for at least a first page of one or more memory pages containing data corresponding to the buffer; or a virtual address to physical address (VA-PA) translation for at least the first page of one or more memory pages containing data corresponding to the buffer.

69. The computer system of clause 67 or 68, wherein each of the processor cores has an instruction set architecture (ISA), and wherein the address hint for each of the one or more buffers is obtained through the use of an ISA instruction in the execution thread executed by the processor core.

70. The computer system of clause 69, wherein execution of the ISA instruction by the processor core causes the processor to:

for each of the one or more buffers, use the virtual address of the buffer as a TLB lookup into one or more TLBs associated with the processor core, the TLB lookup returning a physical memory address comprising a hint.

71. The computer system of any of clauses 67-70, wherein the system further comprises means for:

translating, for each of the one or more buffers, the virtual address for the buffer to a physical address to obtain a currently valid physical address for the buffer; and verifying, for each of the one or more buffers, the address hint for the buffer with the currently valid physical address for the buffer.

72. The computer system of clause 71, wherein the IO interface comprises a Peripheral Component Interconnect Express (PCIe) interface and wherein the processor includes a PCIe root complex coupled to the interconnect fabric and coupled to PCIe interface and the processor is configured to support PCIe Address Translation Service (ATS), and wherein translating a virtual address for a buffer to a physical address for the buffer is facilitated through use of the PCIe ATS.

73. The computer system of clause 66, wherein the information associated with the one or more buffers in system memory comprises a virtual address and a size of each of the one or more buffers, and wherein the system further comprises means for:

for each of the one or more buffers, using the virtual address of the buffer as a TLB lookup into one or more TLBs associated with the core executing the thread, the TLB lookup identifying at least one of a physical memory address comprising a hint or a virtual address to physical address (VA-PA) translation comprising a hint; and speculatively pre-fetching buffer data for the buffer using the hint.

74. The computer system of clause 73, wherein the system further comprised means for:

translating the virtual address for each of the one or more buffers to a physical address to obtain a currently valid physical address; and verifying, for each of the one or more buffers, the hint for that buffer with the currently valid physical address for that buffer.

75. The computer system of any of clauses 66-74, wherein the system further comprises means for:

in response to verifying that the buffer data that is speculatively pre-fetched is the correct buffer data to be processed by the job, continuing processing of the job by processing all of the buffer data that is pre-fetched using one or more functional units of the accelerator.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each apparatus or system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

Italicized letters, such as 'n', and 'm' in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method performed on a computing platform having a multi-core processor coupled to one or more memory devices comprising system memory implemented as shared virtual memory (SVM), the multi-core processor having a plurality of cores, each core associated with at least one translation lookaside buffer (TLB), the multi-core processor further including at least one memory controller operatively coupled via at least one memory channel to one or more memory devices, the computing platform further including one or more SVM-capable accelerators having one or more functional units, the method comprising:

enqueuing, on an accelerator via execution of an execution thread on one of the plurality of cores, a request descriptor for the accelerator, the request descriptor defining a job to be performed by the accelerator and including information associated with one or more buffers in the system memory to be accessed by the accelerator during processing of the request descriptor comprising a virtual address, a size, and an address hint for each of the one or more buffers;

for each of the one or more buffers,
        using the address hint for the buffer to speculatively pre-fetch, via the accelerator, buffer data from the system memory;

speculatively starting processing of the job by processing at least a portion of the buffer data that is pre-fetched using one or more functional units of the accelerator; and verifying whether or not the buffer data that is speculatively pre-fetched is the correct buffer data to be processed by the job.

2. The method of claim 1, wherein the address hint for each of the one or more buffers comprises:
    a physical address for at least a first page of one or more memory pages containing data corresponding to the buffer; or
    a virtual address to physical address (VA-PA) translation for at least the first page of one or more memory pages containing data corresponding to the buffer.

3. The method of claim 1, wherein the address hint for each of the one or more buffers is obtained through the use of an instruction set architecture (ISA) instruction in the execution thread executed by the processor core.

4. The method of claim 3, wherein execution of the ISA instruction by the processor core causes the processor to:
    for each of the one or more buffers,
        use the virtual address of the buffer as a TLB lookup into one or more TLBs associated with the processor core, the TLB lookup returning a physical memory address comprising a hint.

5. The method of claim 1, further comprising:
    translating, for each of the one or more buffers, the virtual address for the buffer to a physical address to obtain a currently valid physical address for the buffer; and
    verifying, for each of the one or more buffers, the address hint for the buffer with the currently valid physical address for the buffer.

6. The method of claim 5, wherein translating a virtual address for a buffer to a physical address for the buffer is facilitated through use of a Peripheral Component Interconnect Express (PCIe) Address Translation Service.

7. The method of claim 1, the information associated with the one or more buffers in system memory comprises a virtual address and a size of each of the one or more buffers, the method further comprising:
    for each of the one or more buffers,
        using the virtual address of the buffer as a TLB lookup into one or more TLBs associated with the core executing the thread, the TLB lookup identifying at least one of a physical memory address comprising a hint or a virtual address to physical address (VA-PA) translation comprising a hint; and
    speculatively pre-fetching buffer data for the buffer using the hint.

8. The method of claim 7, further comprising:
    translating the virtual address for each of the one or more buffers to a physical address to obtain a currently valid physical address; and
    verifying, for each of the one or more buffers, the hint for that buffer with the currently valid physical address for that buffer.

9. The method of claim 1, wherein it is verified that the buffer data that is speculatively pre-fetched is the correct buffer data to be processed by the job, further comprising:
    continuing processing of the job by processing all of the buffer data that is pre-fetched using one or more functional units of the accelerator.

10. A computer system, comprising:
    a multi-core processor, including:
        a plurality of processor cores, each processor core having at least one associated translation lookaside buffer (TLB), each TLB to store a plurality of TLB entries comprising a virtual address to physical address (VA-PA) translation;
        an interconnect fabric, communicatively coupled to each processor core and each TLB associated with each processor core;
        a memory controller, communicatively coupled to the interconnect fabric and having one or more memory channels;
        an input-output (TO) interface, communicatively coupled to the interconnect fabric; and
        an IOTLB to store a plurality of TLB entries comprising VA-PA translations for one or more IO devices;
    system memory comprising one or more memory devices, each communicatively coupled to at least one memory channel of the memory controller;
    a shared virtual memory (SVM)-capable accelerator having one or more functional units, either embedded on the processor or communicatively coupled to the processor via the TO interface;
    wherein the system is configured to,
        enqueue, on the accelerator via execution of an execution thread on one of the plurality of cores, a request descriptor for the accelerator, the request descriptor defining a job to be performed by the accelerator and including information associated with one or more buffers in system memory to be accessed by the accelerator during processing of the request descriptor comprising a virtual address, a size, and an address hint for each of the one or more buffers;
        for each of the one or more buffers,
        employ the address hint for the buffer to speculatively pre-fetch, via the accelerator, buffer data from the system memory;
        speculatively start processing of the job by processing at least a portion of the buffer data that is pre-fetched using one or more functional units of the accelerator; and
        verify whether or not the buffer data that is speculatively pre-fetched is the correct buffer data to be processed by the job.

11. The computer system of claim 10, wherein the address hint for each of the one or more buffers comprises:

a physical address for at least a first page of one or more memory pages containing data corresponding to the buffer; or a virtual address to physical address (VA-PA) translation for at least the first page of one or more memory pages containing data corresponding to the buffer.

12. The computer system of claim 10, wherein each of the processor cores has an instruction set architecture (ISA), and wherein the address hint for each of the one or more buffers is obtained through the use of an ISA instruction in the execution thread executed by the processor core.

13. The computer system of claim 12, wherein execution of the ISA instruction by the processor core causes the processor to:

for each of the one or more buffers,
use the virtual address of the buffer as a TLB lookup into one or more TLBs associated with the processor core, the TLB lookup returning a physical memory address comprising a hint.

14. The computer system of claim 10, wherein the system is further configured to:

translate, for each of the one or more buffers, the virtual address for the buffer to a physical address to obtain a currently valid physical address for the buffer; and
verify, for each of the one or more buffers, the address hint for the buffer with the currently valid physical address for the buffer.

15. The computer system of claim 14, wherein the IO interface comprises a Peripheral Component Interconnect Express (PCIe) interface and wherein the processor includes a PCIe root complex coupled to the interconnect fabric and coupled to PCIe interface and the processor is configured to support PCIe Address Translation Service (ATS), and wherein translating a virtual address for a buffer to a physical address for the buffer is facilitated through use of the PCIe ATS.

16. The computer system of claim 10, wherein the information associated with the one or more buffers in system memory comprises a virtual address and a size of each of the one or more buffers, and wherein the system is further configured to:

for each of the one or more buffers,
use the virtual address of the buffer as a TLB lookup into one or more TLBs associated with the core executing the thread, the TLB lookup identifying at least one of a physical memory address comprising a hint or a virtual address to physical address (VA-PA) translation comprising a hint; and
speculatively pre-fetch buffer data for the buffer using the hint.

17. The computer system of claim 16, wherein the system is further configured to:

translate the virtual address for each of the one or more buffers to a physical address to obtain a currently valid physical address; and
verify, for each of the one or more buffers, the hint for that buffer with the currently valid physical address for that buffer.

18. The computer system of claim 10, wherein in response to verifying that the buffer data that is speculatively pre-fetched is the correct buffer data to be processed by the job, the system is further configured to continue processing of the job by processing all of the buffer data that is pre-fetched using one or more functional units of the accelerator.

19. A multi-core processor comprising:

a plurality of processor cores, each processor core having at least one associated translation lookaside buffer (TLB), each TLB to store a plurality of TLB entries comprising a virtual address to physical address (VA-PA) translation;

an interconnect fabric, communicatively coupled to each processor core and each TLB associated with each processor core;

a memory controller, communicatively coupled to the interconnect fabric and having one or more memory channels;

an accelerator, communicatively couple to the interconnect fabric, having one or more functional units and a request queue, wherein the multi-core processor is configured to be installed in a computer system including system memory comprising one or more memory devices coupled to the one or more memory channels when the processor is installed in the computer system, the computer system employing a shared virtual memory (SVM) architecture, and wherein each processor core has an instruction set architecture (ISA) including an instruction that upon execution, causes the processor to:

enqueue a request descriptor in the accelerator request queue, the request descriptor defining a job to be performed by the accelerator and including an address hint for each of one or more buffers in system memory to be accessed by the accelerator during processing of the request descriptor, wherein the address hint for a buffer is to be employed by the processor to speculatively pre-fetch buffer data corresponding to the buffer from the system memory.

20. The multi-core processor of claim 19, wherein the multi-core processor is further configured to:

in response enqueuing the request descriptor in the accelerator request queue,
employ the address hint for each of the one or more buffers to speculatively pre-fetch buffer data from the system memory for that buffer;
speculatively start processing the job defined by the request descriptor by processing at least a portion of the buffer data that is pre-fetched using one or more functional units of the accelerator; and
verify whether or not the buffer data that is speculatively pre-fetched is the correct buffer data to be processed by the job.

21. The multi-core processor of claim 19, wherein the ISA instruction includes a first operand to store an address of a portal on the accelerator portal to write a request descriptor to in a first register, a second operand to store an address of the request descriptor from a user application running in the system memory in a second register, and a third operand to store a length of the request descriptor in third register.

22. The multi-core processor of claim 21, wherein execution of the ISA instruction by a processor core causes the processor to:

extract data from the request descriptor identifying a virtual address of each of one or more buffers;
for each of the one or more buffers,
use the virtual address of the buffer as a TLB lookup into one or more TLBs associated with the processor core, the TLB lookup returning a physical memory address comprising a hint; and
update the request descriptor to include the hint.

23. The multi-core processor of claim 22, wherein at least one of the buffers includes data stored in multiple pages in the system memory, and wherein execution of the ISA instruction by a processor core causes the processor to:

update the request descriptor with a physical memory address for each of the multiple pages for each buffer that includes data stored in multiple pages in the system memory.

24. A method performed on a computing platform having a multi-core processor coupled to one or more memory devices comprising system memory implemented as shared virtual memory (SVM), the multi-core processor having a plurality of cores, each core associated with at least one translation lookaside buffer (TLB), the multi-core processor further including at least one memory controller operatively coupled via at least one memory channel to one or more memory devices, the computing platform further including one or more SVM-capable accelerators having one or more functional units, the method comprising:

enqueuing, on an accelerator via execution of an execution thread on one of the plurality of cores, a request descriptor for the accelerator, the request descriptor defining a job to be performed by the accelerator and including information associated with one or more buffers in the system memory to be accessed by the accelerator during processing of the request descriptor comprising a virtual address and a size of each of the one or more buffers;

for each of the one or more buffers,
using the virtual address of the buffer as a TLB lookup into one or more TLBs associated with the core executing the thread, the TLB lookup identifying at least one of a physical memory address comprising a hint or a virtual address to physical address (VA-PA) translation comprising a hint; and
speculatively pre-fetching, via the accelerator, buffer data for the buffer using the hint;

speculatively starting processing of the job by processing at least a portion of the buffer data that is pre-fetched using one or more functional units of the accelerator; and verifying whether or not the buffer data that is speculatively pre-fetched is the correct buffer data to be processed by the job.

25. A computer system, comprising:
a multi-core processor, including:
a plurality of processor cores, each processor core having at least one associated translation lookaside buffer (TLB), each TLB to store a plurality of TLB entries comprising a virtual address to physical address (VA-PA) translation;

an interconnect fabric, communicatively coupled to each processor core and each TLB associated with each processor core;
a memory controller, communicatively coupled to the interconnect fabric and having one or more memory channels;
an input-output (TO) interface, communicatively coupled to the interconnect fabric; and
an IOTLB to store a plurality of TLB entries comprising VA-PA translations for one or more IO devices;
system memory comprising one or more memory devices, each communicatively coupled to at least one memory channel of the memory controller;
a shared virtual memory (SVM)-capable accelerator having one or more functional units, either embedded on the processor or communicatively coupled to the processor via the TO interface;
wherein the system is configured to,
enqueue, on the accelerator via execution of an execution thread on one of the plurality of cores, a request descriptor for the accelerator, the request descriptor defining a job to be performed by the accelerator and including information associated with one or more buffers in system memory to be accessed by the accelerator during processing of the request descriptor comprising a virtual address and a size of each of the one or more buffers;
for each of the one or more buffers,
use the virtual address of the buffer as a TLB lookup into one or more TLBs associated with the core executing the thread, the TLB lookup identifying at least one of a physical memory address comprising a hint or a virtual address to physical address (VA-PA) translation comprising a hint; and
speculatively pre-fetch, via the accelerator, buffer data for the buffer using the hint;
speculatively start processing of the job by processing at least a portion of the buffer data that is pre-fetched using one or more functional units of the accelerator; and
verify whether or not the buffer data that is speculatively pre-fetched is the correct buffer data to be processed by the job.

* * * * *